(12) United States Patent
Cohen et al.

(10) Patent No.: US 11,861,507 B2
(45) Date of Patent: *Jan. 2, 2024

(54) DERIVING SEMANTIC RELATIONSHIPS BASED ON EMPIRICAL ORGANIZATION OF CONTENT BY USERS

(71) Applicant: Bublup, Inc., Arlington, VA (US)

(72) Inventors: Alain J. Cohen, McLean, VA (US); Marc A. Cohen, McLean, VA (US); Ryan McKeown, Fairfax, VA (US); Stefan Znam, Rockville, MD (US); Alberto Morales, Reston, VA (US)

(73) Assignee: Bublup, Inc., Arlington, VA (US)

( * ) Notice: Subject to any disclaimer, the term of this patent is extended or adjusted under 35 U.S.C. 154(b) by 1085 days.

This patent is subject to a terminal disclaimer.

(21) Appl. No.: 16/527,707

(22) Filed: Jul. 31, 2019

(65) Prior Publication Data
US 2019/0354876 A1  Nov. 21, 2019

Related U.S. Application Data

(63) Continuation of application No. 15/401,875, filed on Jan. 9, 2017, now Pat. No. 10,410,122, and a continuation of application No. 14/664,166, filed on Mar. 20, 2015, now Pat. No. 9,569,728.

(51) Int. Cl.
| | |
|---|---|
| *G06N 5/02* | (2023.01) |
| *G06F 16/951* | (2019.01) |
| *G06N 5/048* | (2023.01) |
| *G06N 5/04* | (2023.01) |

(52) U.S. Cl.
CPC ............ *G06N 5/02* (2013.01); *G06F 16/951* (2019.01); *G06N 5/04* (2013.01); *G06N 5/048* (2013.01)

(58) Field of Classification Search
CPC ........................................................ G06N 5/02
USPC ........................................................ 707/828
See application file for complete search history.

(56) References Cited

U.S. PATENT DOCUMENTS

| | | | |
|---|---|---|---|
| 2006/0059225 A1* | 3/2006 | Stonehocker | G06F 16/9562 709/202 |
| 2006/0143236 A1* | 6/2006 | Wu | G06F 16/4387 |
| 2012/0084151 A1* | 4/2012 | Kozak | G06Q 30/02 705/14.58 |

* cited by examiner

*Primary Examiner* — Syling Yen
(74) *Attorney, Agent, or Firm* — Danielson Legal LLC

(57) ABSTRACT

A computer-implemented content suggestion engine provides content suggestions to a requesting user based on information about content items that other users may have independently categorized or organized into folders within a content repository. Embodiments of the method comprise a content repository having a plurality of content items, where each content item is associated with one or more user-created folders. Embodiments further comprise receiving, via a network, a suggestion request for suggested content, where the suggestion request identifies a first content item for which suggestions are sought. Other content items in the content repository are then identified as potential suggestions based on the application of a formal relationship between the first content item and the potential suggested content items. One or more of the potential suggested content items may then be provided in response to the suggestion request via the network.

20 Claims, 6 Drawing Sheets

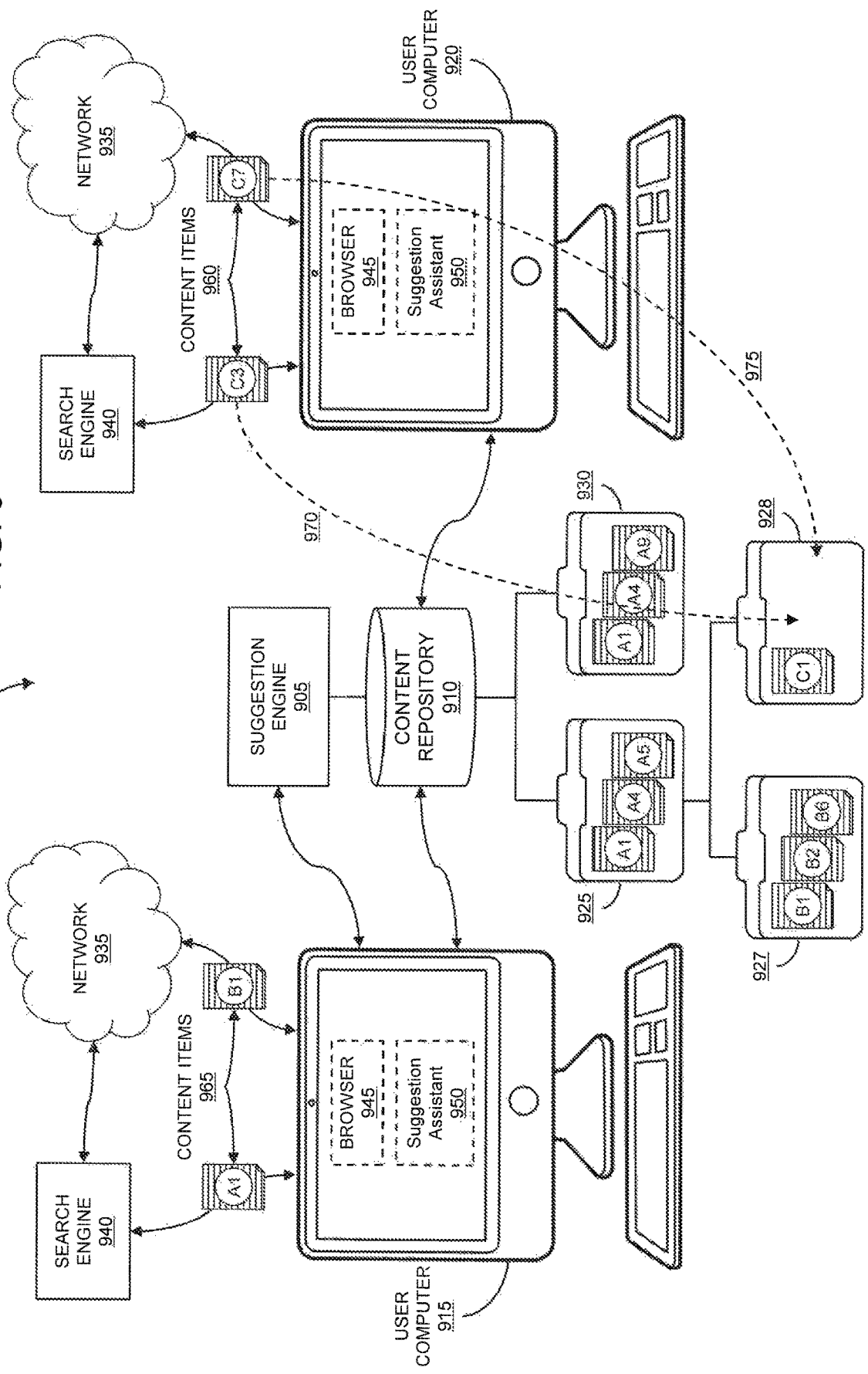

DERIVING SEMANTIC RELATIONSHIPS BASED ON EMPIRICAL ORGANIZATION OF CONTENT BY USERS

CROSS-REFERENCE TO RELATED APPLICATIONS

This application is a continuation of U.S. patent application Ser. No. 15/401,875, filed Jan. 9, 2017, which is a continuation of U.S. patent application Ser. No. 14/664,166, filed Mar. 20, 2015, which claims priority under 35 U.S.C. § 119(e) to U.S. Provisional Patent Application No. 62/080,062, entitled "Systems and Methods for Using Crowd Sourcing Techniques to Obtain Suggestions for Information Content," filed Nov. 14, 2014.

FIELD OF THE INVENTION

Embodiments of the present invention relate to systems and methods for improving a search for content in an information space. More particularly, embodiments of the present invention relate to systems and methods for using crowd-source techniques to obtain suggestions for information content.

BACKGROUND

Information spaces, such as the Internet, enterprise networks, document repositories, and information storage and retrieval services allow widespread access to large collections of information. For example, users commonly use search engines to locate and select desired information on the Internet. Many entities, such as businesses, individuals, government organizations, etc., now use the Internet to publish information as well as to advertise goods and services. Publishers have an interest in ensuring that their content can be easily located. Also, users performing searches have an interest in locating items that are most relevant to their search.

Search engines assist users in locating items in an information space. Such items can include documents, web pages, images, videos, and many other kinds of information known in the art. The search engines typically use search algorithms that employ either literal keyword matching techniques or approximate matching of the words or symbols specified in a user's query or search request. Thus, in conventional search engines, a user searching for information must provide keywords that will hopefully match desired content. At the same time, entities who wish to provide content must attempt to anticipate how their information will be searched and then tag their content in the hope that their tags, as well as the actual text of their content, will match user-provided keywords in order to provide the most appropriate content in response to user search requests. In practice, however, this methodology is less than ideal for both content users and content providers.

A variety of keywords can map to conceptual ideas in multiple and non-unique ways, which can make tagging and keyword searching difficult. In addition, a given combination of keywords may not be the same between two users seeking similar content. Accordingly, concept matching or semantic matching within search engines can be poor. Conventional search engines can also be ineffective at ascertaining meaning that is inherent in content items. Indeed, because, for many documents, content is expressed in natural language with no convention or structure governing the meaning of the content, search engines are, in general, unable to locate the most appropriate content reliably. It is not currently feasible to rely on search engines to derive semantic meaning or significance from online content by using automated algorithms alone. For example, a user researching accidents with significant media coverage in 2014 might query a conventional search engine with the phrase "spectacular accidents 2014." One of the first results for such a search would likely be an entirely irrelevant article entitled, "Flavie Audi: Spectacular Accidents—The young architect forges a new path in glass."

In contrast to automated search algorithms, human ingenuity is often capable of going far beyond the capabilities of existing search systems to identify new or interesting content. Certain "crowd-sourcing" techniques constitute one such set of approaches. To date, however, crowd-sourcing techniques have been limited or have been constrained to specific applications or uses.

One example of a system that attempts to enhance automated search techniques by using a crowd sourcing approach is U.S. Pat. No. 8,825,701 to Stefano Ceri, et al. ("Ceri"). Ceri teaches an interactive social networking approach to online searching, where a given search request is proposed to a crowd of cooperating online individuals. A query execution plan is also provided by Ceri's system. While following that query execution plan, each of the cooperating individuals attempts to answer the search request. When a sufficient number of answers have been collected, the answers are processed to generate an output result, which is then presented to the original requesting user.

U.S. Pat. No. 8,055,673 to Elizabeth Churchill, et al. ("Churchill") discloses a similar approach involving a collaborative search engine. Following Churchill's methods, a first user interacts with a search engine to initiate an Internet search. The first user can then elicit the help of search friends, who receive the results of the initial. Internet search and provide additional search recommendations in response. Finally, the first user can integrate the received search recommendations and modify the initial Internet search based on those recommendations.

In the field of online product sales, companies like Amazon.com, Inc. can provide product suggestions to users based on the shopping actions of other users who viewed and/or purchased similar products in the past. U.S. Pat. No. 7,113,917 to Jennifer Jacobi et al. ("Jacobi") is an example of the Amazon technique. In Jacobi, a computer system maintains item selection histories of online shoppers. The item selection histories are collected and analyzed off-line to generate a set of data values that represent degrees to which specific items in Amazon's catalog are related to each other. The item relationship data are stored in a mapping structure that maps items to related items. Then later, while a user is shopping, the mapping structure can be used to generate personalized recommendations of related items in the Amazon catalog.

In the field of online searching, companies like Google may provide users an option to view additional documents that are similar to a given search result returned in response to a user's query. By selecting a "similar" option from a pull-down list, a user is presented with a list of documents that have a high cosine similarity to an original document. This is not a crowd-sourced technique, but it represents an additional method known in the art for suggesting new content. To calculate a cosine similarity of two documents, each term in a document is typically assigned a different dimension. A multi-dimensional vector is constructed to characterize each document, where the value of each dimension in the vector corresponds to the number of times that a given term appears in the document. The cosine similarity of the two documents is then calculated from the two vectors, where similar documents will typically have vectors that point in similar directions. Cosine similarity measures are limited, however, by the fact that they compare actual terms found in documents. That is, cosine similarity calculations do not perform a separate semantic analysis of individual terms in a document prior to comparison, nor do they reliably reflect the way humans typically think about relationships among the documents.

SUMMARY OF THE INVENTION

This summary is provided to introduce certain concepts in a simplified form that are further described below in the Detailed Description. This summary is not intended to identify key features or essential features of the claimed subject matter, nor is it intended to limit in any way the scope of the claimed invention.

Embodiments of the present invention are directed to providing content suggestions in an information space, based on at least one content item that a user may have identified or received in response to a search, combined with information about related content items that other users have independently categorized or organized. A content item (also referred to herein as "content" or "item") is a discrete digital information resource, such as a document or file that is accessible by a computer. Content items may comprise, for example, web pages, snapshots or archived versions of those web pages (including discrete historical versions), images, videos, audio files, multimedia files, data files, documents, or other digital items that can be presented to a user via a browser or other type of content interface application, content viewing application, or computer file management software. Content items may also include links, Uniform Resource Locators ("URLs"), and other pointers or references corresponding to the content.

In one embodiment, a plurality of computer users may perform searches for content in an information space such as the Internet, utilizing any of a number of search engines known in the art. In response to the searches, the users may receive search results comprising content items and/or links to content items, and may optionally receive a short synopsis or summary of each returned content item and/or link. Each user may then organize at least some of the received content items by saving them to a content repository for later use. A user may save a content item in several ways known by persons of ordinary skill in the art, including: by navigating to the page specified by a link and then clicking on a "save" button; and by placing or dragging and dropping a content item (or its link) into a folder, where each folder corresponds, at least in part, to the user's subjective organization of his or her content. Each user's content and folder structure may then be shared with, published to, or otherwise made accessible to, an automated suggestion engine. The suggestion engine can be configured to access the shared content and provide content suggestions to requesting users, where the content suggestions are determined by the suggestion engine to be related to content that has been previously saved and organized into folders. For summary purposes, a folder comprises a logical container for organizing content items within a content repository. A folder may contain other folders as well as content items. As a result, a content repository can present to a user as a logical nested tree structure of content. As discussed below, a content repository may be implemented in a variety of ways known to those skilled in the art.

In another embodiment, a first computer user may have compiled or collected content items using a number of methods known in the art, including receiving content from Internet searches, downloading content from computers located on a network, receiving content from other users, and creating new content. The first user may then organize at least some of the collected content items by placing them into a folder structure in a content repository, where each folder corresponds, at least in part, to the first user's subjective categorization of content. The first user's content and folder structures may then be shared with, published to, or otherwise made accessible to, a suggestion engine that is configured to access the shared content and provide new content suggestions to a second user who wishes to identify new content that is potentially related to content already identified by the second user.

In yet another embodiment, a computer user may receive a search result in response to a search request performed in an information space such as the Internet. The user may then provide the search result to a suggestion engine that is configured to access shared content previously provided to the suggestion engine by other users. Alternatively, the suggestion engine may be configured to monitor the user's search result and automatically access the shared content without receiving specific direction to do so. Based on the search result and other users' prior subjective organizations of shared content, the automated suggestion engine may suggest at least one content item from the shared content as being potentially relevant to the search result.

In still another embodiment, a computer user may provide a first content item to an automated suggestion engine without first performing a search, for example, in response to a user action such as accessing a web page or navigating from one web page to another. As with some other embodiments, the suggestion engine is configured to access shared content previously provided to the suggestion engine by other users. Based on the first content item and the other users' prior subjective organizations/categorizations of the shared content, the automated suggestion engine may suggest at least one content item from the shared content as being potentially relevant to the first content item.

The above summaries of embodiments of the present invention have been provided to introduce certain concepts that are further described below in the Detailed Description. The summarized embodiments are not necessarily representative of the claimed subject matter, nor do they span the scope of features described in more detail below. They simply serve as an introduction to the subject matter of the various inventions.

BRIEF DESCRIPTION OF THE DRAWINGS

So the manner in which the above recited summary features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 9 illustrates an embodiment of a suggestion engine, in accordance with the present invention.

DESCRIPTION OF THE EMBODIMENTS

Figure 1:
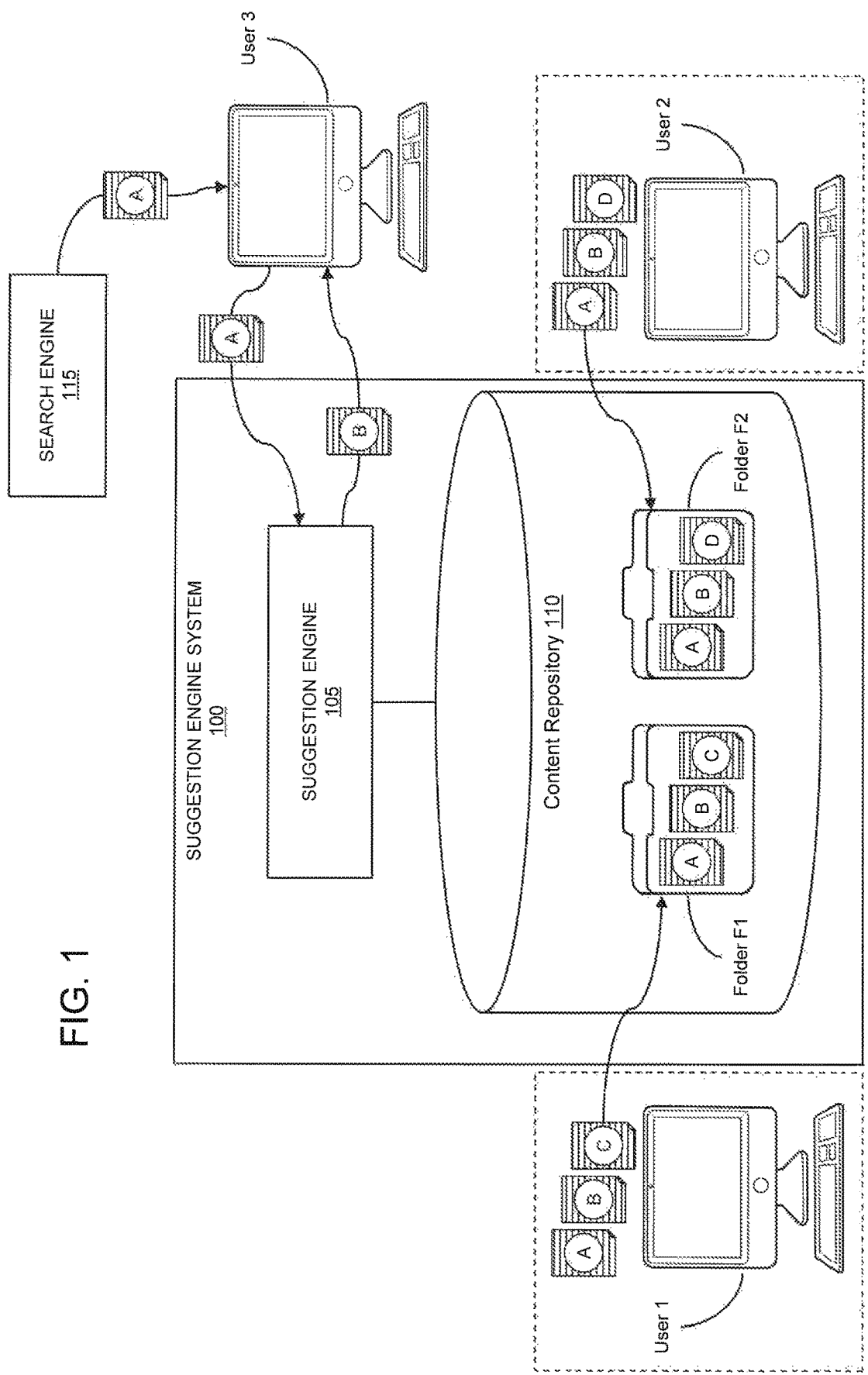
FIG. 1 illustrates an exemplary embodiment of a suggestion engine system, in accordance with the present disclosure.

Embodiments of the present invention will be described with reference to the accompanying drawings, wherein like parts are designated by like reference numerals throughout, and wherein the leftmost digit of each reference number refers to the drawing number of the figure in which the referenced part first appears.

Overview of a Suggestion Engine

As summarized above, embodiments of the present invention provide a novel approach for suggesting content items to supplement a user's search for information in an information space. An information space can be any body of information having individual items of content. An example of an information space is the World Wide Web ("WWW" or "Web") comprising a system of interlinked hypertext documents accessed via the Internet.

To provide content suggestions, embodiments of a suggestion engine can search a content repository (also referred to herein as a "data store"), and based on a variety of techniques discussed below, identify content items that are semantically related to each other. Importantly, the determination of semantic relatedness is based on actions that users have taken within the content repository to organize and associate content items together in folders.

A simple example may facilitate further discussion. Referring now to FIG. 1, which illustrates an exemplary embodiment of a suggestion engine system 100 in accordance with the present disclosure, suppose User 1 has collected a set of documents A, B, and C, and associated them with a Folder F1, where Folder F1 resides within a content repository 110 provided by an embodiment of the invention. Folder F1 could be a private folder for use only by User 1 or it could be a public folder, the contents of which can be accessed by other users of the system.

Suppose further that User 2 has collected a set of documents A, B, and D, and associated them with a Folder F2, where Folder F2 also resides within the content repository. Just like Folder F1 could be private or public, Folder F2 could also be a private folder for use only by User 2 or it could be a public folder, the contents of which can be accessed by other users of the system.

Now assume User 3 conducts an Internet search and receives document A from a search engine 115. User 3 could then ask suggestion engine 105 for additional content that is semantically related to document A. Or, the suggestion engine 105 could be configured to independently suggest content that is semantically related to received document A without first receiving an explicit user request for that content (for example, suggestion engine 105 may have received a notification that User 3 has received document A or has associated document A with a folder). In either case, because both User 1 and User 2 have associated document A with document B by placing the two documents together in a folder (User 1 associated the two documents together in Folder F1; User 2 associated the same two documents together in Folder F2), the suggestion engine 105 may conclude that documents A and B are semantically related and therefore provide document B as a new content suggestion to User 3. Embodiments of the present invention are directed to systems and methods for providing suggestions in this fashion, using folder-like association criteria summarized in the example above, as well as more complex relational criteria described below.

In the above example, documents A and B can be described as being "neighbors" of one another because at least one user has associated both documents with the same folder. For the same reason, documents A and B can be said to have "copresence" or be "copresent" with one another. Embodiments of the invention may derive significant meaning from copresence and the copresence count (i.e., the number of folders associated with a pair of content items). A high count for a pair of content items indicates that many users believe the two content items belong to, or are useful content to have, with respect to the same subject area. It therefore stands to reason that a user who has only one of those two content items is likely to have an interest in the other content item, as well. This general principle can be extended and refined to capture more complex relationships and discovery patterns, such as "find the neighbors of my neighbors," as well as many others. The copresence count is used by embodiments of the suggestion engine to compare and triage a group of copresent content items in order to prioritize them relative to each other. In other words, a copresence count can be viewed as one type of measure of the "strength" of the relationship between two content items.

Content Repository

Figure 2:
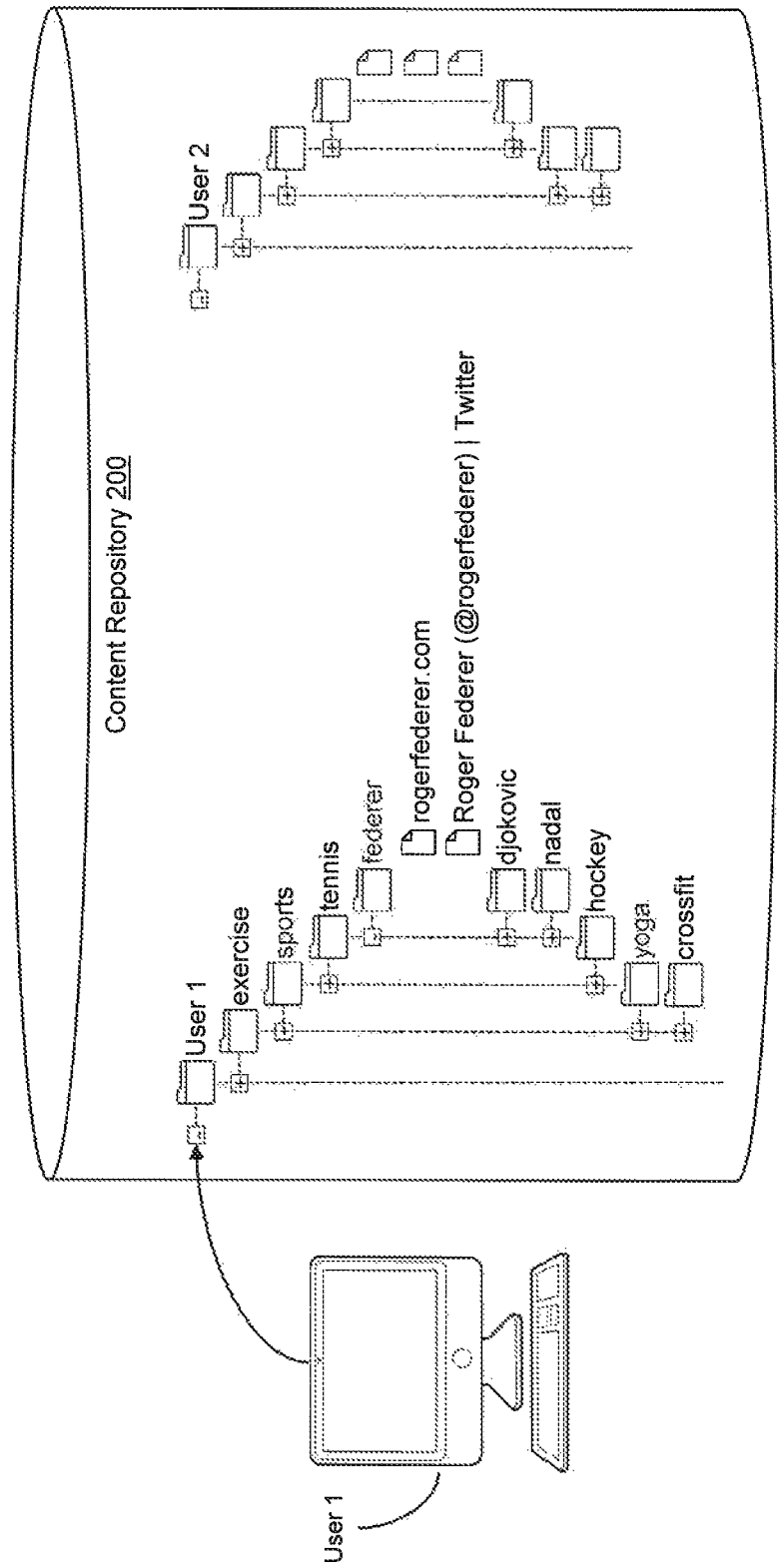
FIG. 2 illustrates an exemplary embodiment of a content repository, in accordance with the present invention.

Embodiments of the invention can provide content suggestions to a community of users based in part on the users' interactions with content items that are stored and managed in a content repository. FIG. 2 illustrates an exemplary embodiment of a content repository 200 in accordance with the present invention. A content repository is also shown as item 110 of FIG. 1. Conceptually, a content repository 200 is a set of logical containers capable of organizing content items. The content repository 200 may be structured logically as one or more folder hierarchies, where each folder may contain other folders as well as content items, thereby reflecting a nested tree structure. Other equivalent logical structures are also possible, including, for example, a file system directory structure, or a database that incorporates folder-like document storage features.

A content repository can be implemented using various data structures, including any combination of trees, lists, graphs (cyclic or acyclic, hierarchical or non-hierarchical), databases, and/or other appropriate data structures known in the art. In at least one embodiment, the content repository 200 is configured to support a hierarchy of folders.

The storage and access methods for a content repository 200 may be implemented using cloud-based techniques, and may further include distributed software and data access techniques where portions of the content repository (including mirror and backup copies) may be located on a plurality of computing systems, including servers. Some user-specific portions of a content repository (including, for example, user folders for organizing a user's own personal content items) may be implemented physically on a user's own client device, such as a hard disk drive or equivalent device, but the same user-specific portions may also be implemented remotely or virtually using network services known in the art, including cloud-based network services.

Some embodiments may provide methods that enable a user to navigate through portions of a content repository 200, for example, portions of a content repository that correspond to a user's own folders. Such embodiments may further provide methods that permit a user to create, move, rename, delete, and edit folders, as well as the content items within them.

Optionally, some embodiments may allow the same content item to appear within the content repository 200 in multiple folders. Some embodiments may place a limit on the number of folders that can reference the same item, while other embodiments may allow this number to be unbounded.

As mentioned above, FIG. 2 illustrates an exemplary embodiment of a content repository 200 in accordance with the present invention. In this particular illustration, User 1 is shown to have created a set of folders within content repository 200 to hold exercise-related information. Under a folder named "exercise," User 1 has created subfolders named "sports," "yoga," and "crossfit." Under the sports folder, User 1 has created subfolders named "tennis" and "hockey." Under the tennis folder, User 1 has created subfolders "federer," "djokovic," and "nadal." User 1 has also associated two content items with the federer folder. One content item is named "rogerfederer.com." The other content item is named "Roger Federer (@rogerfederer) |Twitter." It should be understood that, for purposes of determining whether a content item is contained in a given folder, content items in subfolders of a parent folder can be considered to be contained in the parent folder for the purpose of generating suggestions. In the above example, the content item "rogerfederer.com" is in the federer folder, and therefore a suggestion engine can also consider "rogerfederer.com" to be in the tennis folder, the sports folder, and the exercise folder.

FIG. 2 also shows a set of folders and content items created by another user indicated by the name "User 2." The folders and content items associated with User 2 are not shown as having names, but one of ordinary skill in the art will understand that the folders and content items associated with either User 1 or User 2 can be arranged and named (or not named) in any manner supported by the content repository 200 and according to the needs and likes of the respective users.

Semantic Relatedness of Content Based on User Actions

Certain aspects of the semantic meaning of content items can be based on interpretations of behaviors and interactions users take to organize the content items within a content repository or data store. For example, content items that a user places together in the same folder in the content repository can be assumed to be related in terms of their semantic content.

By leveraging semantic meaning from the user interactions, embodiments of the invention can flexibly adapt and respond to evolving changes in user perceptions and understandings of their content without the need for extensive analysis of the content items themselves. That is, semantic similarities can be inferred from the relationships of content items to each other, based on actions that users have taken within the content repository 200 to organize and associate the content items with folders and similar content organizing structures.

Such an approach is in stark contrast to conventional methods of organizing content items according to specific properties (usually predefined) of the content items. In a property-based approach, two content items might both be associated with a particular property (for example, using tags, categories, etc.), but it does not necessarily follow that one of the content items is a good suggestion for the other content item. For example, two content items named "rogerfederer.com" and "woodtennisrackets.com" might both be associated with the property "tennis," but little can derived about whether users interested in one might also be interested in the other. On the other hand, the semantic approach of the present invention identifies more meaningful relationships between the two content items. If, for example, many users associated the two content items with the same folder, then there is more confidence that one content item is a good suggestion for the other. Similarly, if no users have associated the two content items with the same folder, then there is less confidence that one is a good suggestion for the other.

Providing Content to a Suggestion Engine

In some embodiments, a search operation with a conventional search engine (for example, search engine 115 of FIG. 1) is not required in order to provide content to a suggestion engine as a basis for obtaining suggestions. Users can obtain content in many ways. For example, a user can navigate through a public portion of a content repository to discover and view content, which can be supplied to a suggestion engine for the purpose of obtaining suggestions. Thus, in such an embodiment, users are able to receive suggestions for each content item that they view as they navigate using a browser or other application used for viewing content. Users can also create or supply their own content to a suggestion engine. Such user-supplied content can be created from scratch, obtained from friends or colleagues, or acquired from any other source available to a user.

In embodiments, users can interact with content repositories that are small or moderate in size, as well as large distributed repositories, including, for example, document repositories such as Lexis (www.lexisnexis.com), the Library of Congress (www.loc.gov), Wikipedia (www.wikipedia.org), the JAMA Network (www.jamanetwork.com), and the Institute of Electrical and Electronics Engineers (www.ieee.org). Alternative content sources can also include private sources available to individual users and groups of users, as well as user-created content.

Basis Data Sets Available to a Suggestion Engine

Embodiments of a suggestion engine provided by the present invention (such as suggestion engine 105 illustrated in FIG. 1) can operate on a variety of basis data sets corresponding to data objects, operands or information entities. Examples of such basis data sets include the following:

Content items. As mentioned above, a content item (also referred to herein as "content," or "item") is a discrete digital information resource, such as a document or file that is accessible by a computer. Content items may include links or Uniform Resource Locators ("URLs") that correspond to specific digital information resource(s). Content items may comprise, for example, web pages, images, videos, audio files, multimedia files, data files, documents, or other digital items that can be provided to a user via a browser or other type of content interface application or computer file management software. Content items may also include the corresponding web pages, images, videos, audio files, multimedia files, data files, documents, or other digital items themselves. The term "document" is intended to have the broadest meaning known in the art and should be understood to include documents of all kinds, such as PDF documents, word processing documents (for example, Microsoft Word documents), spreadsheets (for example, Microsoft Excel spreadsheets), presentation files (for example, Microsoft PowerPoint presentations), graphics files, source code files, executable files, databases, messages, configuration files, data files, and the like. Content items can be accessed, reviewed, modified, and saved by users of systems implemented by any of the embodiments.

Folders. Folders are logical container objects in which users can place content items when they are saving, organizing, and categorizing them. Users can create folders and decide which items should go into which folders based on their individual beliefs about useful categorizations of the items. Because a content repository may be distributed across different computing systems, folders may be stored or cached locally on a user's own computing device, stored remotely or virtually using remote services over a network, such as cloud-based storage, and/or stored globally using a global organized content structure. A user's decision to store or associate a particular content item with a particular folder may be affected by recommendations offered by embodiments of the invention, based on semantic information about the content items themselves, semantic information derived from locations where the content items were found, and other factors discussed herein.

Embodiments of the suggestion engine may also operate on additional information, such as metadata about the users and the content items, sources of the content items, histories of user activity with respect to the content items, user demographics, user groupings, and other information typically stored with documents to facilitate access, searching, and administration.

As stated above, a content repository can be implemented using a variety of techniques and data structures known in the art. Since the content repository includes folders, the various implementations of the content repository also apply to the implementation of folders.

The content repository may manage or control user access to folders as well as the content items within the folders. Folders may be private or public, shared or restricted, user-specific or group-specific, or any combination thereof.

Although folders are defined as container objects and are often described as containing content items that are saved, placed, stored, put, or located in folders by users, the concept of "containment" is logical and abstract, and can be implemented in many different ways by persons skilled in the art of software engineering. For this reason, the disclosure may sometimes use phrases such as "saved in," "associated with," or "organized into" as equivalent ways of describing the concept of folder containment.

Further, when a user saves a content item in a folder, he or she may not be saving the original content item, but rather a copy of the content item or a pointer or reference to the content item. For example, where the content item is a web page, the user may save a URL corresponding to the content item. Or where the content item is an image, the user may save a copy of the original image. For purposes of this description, both the original content item and the copy, pointer, or reference may be considered "the content item," and each one is itself a content item. Similarly, if two or more users save a content item to their respective folders, and each of the content items is substantially similar to each of the other content items, each of the content items may be considered "the same content item."

Relationships Underlying Suggestions

Embodiments of a suggestion engine may offer multiple approaches to generating suggestions, each of which provides users of the engine with alternatives for controlling the scope and types of suggestions. All of the approaches are based on determining formal relationships among the components of the basis data sets and entities that are at play, including the specific content items, folders, and users. In the context of describing embodiments of the invention, a formal relationship will be understood by one skilled in the art to be a property that associates an ordered tuple of elements with a truth value, which indicates whether the tuple of elements satisfies the property. In many embodiments, the tuple is a pair of elements, but in some embodiments, it may also be an n-tuple, where n is greater than 2, or the tuples may contain varying quantities of elements. For purposes of this disclosure, when elements A and B are related under relationship R, they are said to "satisfy the relationship R." Alternatively, it is appropriate to say, "A is related to B under relationship R," and one can "evaluate relationship R with respect to A and B in order to determine if R is satisfied."

Based on certain formal relationships discussed below, a suggestion engine can determine which entities satisfy the relationships either by pre-computing the relationships (i.e., finding answers before they are requested), or computing the relationships upon request. Either of these techniques can be applied by embodiments of a suggestion engine, depending on which workflow the engine is supporting.

In the following sections, some exemplary methods are disclosed for finding entities that satisfy certain formal relationships. The exemplary methods operate on a data model that assumes (1) entities of interest (for example, content items) can be identified and enumerated; (2) the suggestion engine can examine their relevant properties; and (3) relationships among the entities can be discovered. For example, given a particular folder, including a folder at any arbitrary level in a hierarchy of folders, embodiments of a suggestion engine can determine which content items are included in or associated with that folder, optionally traversing a folder hierarchy or tree structure to access content items that may be associated with subfolders. Similarly, given a content item, embodiments of the suggestion engine may determine which folders are associated with a given content item and what other content items are contained or associated with those folders. Many different implementations are possible, and each may depend on various storage technologies and computing languages. Furthermore, specific enhancements or optimizations to the data model of the content repository may provide advantages in memory consumption and/or speed while executing the suggestion generation methods.

Relationships Among Folders

Two folders that share specific content items are called "Specific Commonality Neighbors." They are defined more rigorously as follows: two folders, $F_1$ and $F_2$, are specific commonality neighbors if they both contain a specific, non-empty set of content items $\{C_1, C_2, \ldots C_m\}$. The notation for this relationship is SP, which is written as $F_1:SP:F_2$.

Two folders that share a certain number of content items are called "Sufficient Commonality Neighbors." They are defined more rigorously as follows: two folders, $F_1$ and $F_2$, are sufficient commonality neighbors if they both contain at least j common content items (j>0), where j is the "commonality count threshold." The notation for this relationship is SU, and it is written as $F_1:SU:F_2$ in the general case, or $F_1:SU(j):F_2$ to specify j.

Depending on the particular relationship discussed herein, the term "threshold" can correspond to an integer value, a percentage, a proportion, or any other limiting value. In the case of the commonality count threshold identified in the Sufficient Commonality Neighbor relationship, the threshold is an integer value. One skilled in the art will understand that the numerical representation and interpretation of the threshold will depend on the context in which it is used.

Two folders that are both specific commonality neighbors and sufficient commonality neighbors are called "Hybrid Commonality Neighbors." More precisely, two folders, $F_1$ and $F_2$, are "Hybrid Commonality Neighbors" if they both contain at least j common content items (j>0), where j is the "commonality count threshold" and in addition, both $F_1$ and $F_2$ contain a specific, non-empty set of content items $\{C_1, C_2, \ldots C_m\}$. The notation for this relationship is H, and it is written as $F_1:H:F_2$ in the general case, or $F_1:H(j):F_2$ to specify j.

A folder $F_2$ is a "Sufficiently Specific Neighbor" of folder $F_1$ if $F_2$ contains at least j items in common among m specific content items $\{C_1, C_2, \ldots C_m\}$ contained by $F_1$ (j<=m), where j is the "commonality count threshold." The notation for this relationship is SS and it is written as $F_1:SS:F_2$ in the general case, or $F_1:SS(j):F_2$ to specify j. When j=m, relationship SS is the same as relationship SP. This relationship is not necessarily symmetrical. That is, although $F_1$ may contain j out of m specific content items found in $F_2$, $F_2$ may not necessarily contain j out of m specific content items found in $F_1$.

A folder $F_2$ is a "Proportionate Commonality Neighbor" of folder $F_1$ if $F_2$ contains at least (r*100)% of the same content items contained in $F_1$. In other words, if the intersection of $F_1$ and $F_2$ contains at least (r*100)% of the content items contained in $F_1$, then $F_2$ is a proportionate commonality neighbor of $F_1$. The variable r is the "commonality proportion threshold" (0<r<=1). The notation for this relationship is PC and it is written as $F_1:PC:F_2$ in the general case, or $F_1:PC(r):F_2$ to specify r. This relationship is not necessarily symmetrical.

A folder $F_2$ is a "Proportionate and Specific Commonality Neighbor" of folder $F_1$ if $F_2$ contains at least (r*100)% of the content items contained in $F_1$ and in addition, both $F_1$ and $F_2$ contain a specific, non-empty set of content items $\{C_1, C_2, \ldots C_m\}$. The variable r is the "commonality proportion threshold" (0<r<=1). The notation for this relationship is PSC. It is written as $F_1:PSC:F_2$ in the general case, and $F_1:PSC(r):F_2$ to specify r. Just like relationship PC, this relationship is not necessarily symmetrical.

As mentioned above, given a particular folder F residing at any arbitrary level in a hierarchy of folders, embodiments of the invention can evaluate any of the folder-based relationships to determine which content items are included in or associated with folder F, as well as determine which content items are included in or associated with any subfolders of F.

Relationships Among Content Items

Two content items $C_1$ and $C_2$ are "Neighbors" if there exists at least one folder that contains both $C_1$ and $C_2$. The notation for this relationship is N, and it is written as $C_1:N:C_2$.

Two content items $C_1$ and $C_2$ are "j-Neighbors" if there exist at least j folders in the content repository that contain both $C_1$ and $C_2$. The notation for this relationship is N(j), and it is written as $C_1:N(j):C_2$. The variable j is the "copresence threshold." The Neighbor (N) relationship is a special case of j-Neighbor, where j=1.

Content item $C_2$ is a "Synonym" of $C_1$ if $C_2$ appears in at least (p*100)% of the folders in which $C_1$ appears. The variable p is the "copresence ratio" of $C_2$ relative to $C_1$. The notation for this relationship is $C_1:SY:C_2$ in the general case, and $C_1:SY(p):C_2$ to specify p. This relationship is not necessarily symmetrical.

Two content items $C_1$ and $C_2$ are "joint Synonyms" if $F_1$ (the set of all folders that contain $C_1$) and $F_2$ (the set of all folders that contain $C_2$) are such that the intersection of $F_1$ and $F_2$ contains (p*100)% of the folders in the union of $F_1$ and $F_2$ (0<p<=1.0). The variable p is the "joint copresence ratio." The notation for this relationship is $C_1:JS:C_2$ in the general case and $C_1:JS(p):C_2$ to specify p.

Other Relations

The set of relationships described above is not exhaustive. A number of additional relationships can be employed by those skilled in the art, including relationships that result from a combination of those described above. For example, a new relationship can be defined by requiring that two particular relationships hold true for a pair of folders or content items. The process of combining relationships to create new ones is a natural one for anyone skilled in the art of algorithm development. Other relationships include the following:

Folder relationships based on independent content. The word "independent," in this case, refers to the fact that a set of content items is selected first, and need not be a proper subset of either folder in a folder-to-folder relationship. A simple example of such a relationship is the following:

A reference set of content items $\{C_1, C_2, \ldots C_m\}$ is designated.

Then, a folder-to-folder neighbor relationship, "R(j)," is defined as follows: $F_1:R(j):F_2$ if both $F_1$ and $F_2$ each contain at least j content items that are in $\{C_1, C_2, \ldots C_m\}$.

Folder relationships based on content item relationships. "Based on" refers to a situation when relationships among content items, such as those described earlier, must be known as a first step in establishing the folder-to-folder relationships. For example, the relationship "FN(j, m)" is defined between folders as follows:

$F_1:FN(j, m):F_2$ if both $F_1$ and $F_2$ contain at least m pairs of the same content items $\{(C_1, C_2), (C_3, C_4), \ldots (C_{2m-1}, C_{2m})\}$, such that for each pair, the two content items in that pair are j-neighbors.

For example, take j=100 and m=2. From the earlier definition of j-neighbors, $C_1:N(100):C_2$ means that $C_1$ and $C_2$ appear together in at least 100 folders. Similarly for $C_3:N(100):C_4$. If two folders, $F_1$ and $F_2$, both contain $C_1, C_2, C_3$, and $C_4$, then these folders are related under FN(100,2). The FN relationship places an emphasis on folders not only having common content items, but also requires that those common items appear together with a certain frequency outside the context of those folders. In colloquial terms, one might say that this relationship ensures that the combined presence of these items is not a "fluke" (i.e., a chance occurrence) that takes place only in the folder $F_1$ and $F_2$. A key aspect of this class of relationship is that it is drawing upon information that is exogenous to the folders themselves.

Multi-Hop Neighbor Extension; Distance. For each neighbor relationship, R, defined above, one can define a multi-hop version of the relationship, $R^m$, defined for $m>1$ as follows: Two entities (for example, content items, or folders), $X(0)$ and $X(m)$, are related by $R^m$, if there exists at least one set of entities in the content repository $\{X(1), \ldots, X(m-1)\}$ such that $X(j):R^m:X(j+1)$ for all $j$ ($0<=j<m$). In other words, although two entities are not related as direct neighbors, they can be "indirectly" related by traversing a series of consecutive directly related neighbors. The ordered tuple of entities connecting the two related entities (including the end points) is called the "path" between the related entities.

By applying the multi-hop concept to the Sufficient Commonality Neighbor relationship with the number of hops $m=2$, a new relationship can be defined, called "$SU^2$", which states that for two folders $F_1$ and $F_2$, $F_1:SU^2:F_2$ if there exists at least one folder Fx such that $F_1:SU:F_x$ and $F_x:SU:F_2$. The path between $F_1$ and $F_2$ is the triplet $(F_1, F_x, F_2)$.

As a second example, one can apply the multi-hop concept to the j-Neighbor relationship among content items, using $m=3$, and $j=100$. The statement $C_1:N(100)^3:C_2$ means that there exists at least two content items, $C_x$ and $C_y$, such that: (a) $C_1$ belongs to at least 100 folders to which $C_x$ also belongs; (b) $C_x$ belongs to at least 100 folders to which $C_y$ also belongs; and (c) $C_y$ belongs to at least 100 folders to which $C_2$ also belongs.

Note that for certain relationships, it is not meaningful to define a multi-hop version extension of the relationship. For example it is not useful to define $SP^m$, as all folders in the path would also be immediate neighbors, since by definition, they must all contain the same specific set of content items.

The "distance" between two entities under relationship R is defined to be the number of hops in the shortest path between those two entities using relationship R. Immediate neighbors have a distance of 1 between them.

In some of the relationships described above, it may be necessary to determine whether two different folders contain a given content item $C_i$, or to determine whether one content item $C_1$ and another content item $C_2$ are sufficiently similar to be considered identical for purposes of satisfying the relationship criteria. In these circumstances, an identical match is not necessarily required. It may be sufficient, for example, to require two content items $C_1$ and $C_2$ to be only substantially similar. The criteria to establish substantial similarity can depend on a variety of factors including the type of content involved. For example, content corresponding to two URLs can be assumed to be substantially similar if the URLs themselves are identical. Content corresponding to two URLs can also be considered substantially similar if they point to equivalent content through different naming conventions or computing platforms (for example, mobile vs. desktop). As another example, two content items can be considered substantially similar if they share a high cosine similarity. As yet another example, two content items can be considered substantially similar if a selected percentage (for example, 95%) of the text within the two content items is identical, or the differences between the two content items are negligible. Negligible differences may include, without limitation, differences in metadata and/or timestamp information, advertising differences, header/footer differences, banner differences, and/or differences with respect to user comments. Other methods of determining substantial similarity of content are possible and within the scope of the present invention.

Suggestion Engine Methods

With various neighbor relationships defined and a notion of distance between entities (either folders or content items) provided, operations provided by embodiments of a suggestion engine can now be described in terms of the basis data sets and the relationships that are used to locate potential content items of interest. In general, this section describes how to generate a "pool" of content items that are likely to be relevant suggestions. A series of methods for generating suggestions from basis data sets are explained, and variations of those methods that utilize additional input parameters are discussed.

The methods in following sections refer to the concept of "adding items to the pool" of suggestions. Many of the methods described herein may add the same item to the pool multiple times. From an algorithmic perspective, the multiple additions may be relevant to the results that are produced. However, it may be useful, especially for efficiency purposes, to place each content item in the pool only once. When a method would add the same item to the pool again, rather than introduce a redundant item, the method can increase a counter associated with that item to reflect the frequency with which it appears in the pool. This is an implementation choice that does not affect the functionality of the methods.

Methods for a Specific Content Item

Figure 3:
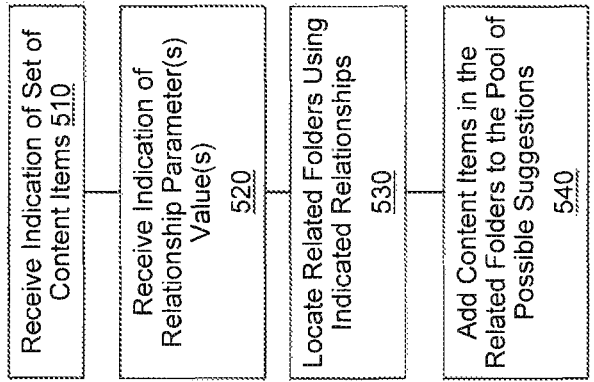
FIG. 3 illustrates an exemplary embodiment of a general method for providing suggested content items, in accordance with the present invention.

FIG. 3 illustrates an exemplary embodiment of a general method for providing suggested content items. At Step 310, the method of FIG. 3 begins with a content repository (for example, the content repository 110 shown in FIG. 1) receiving an indication that a specific user, in this case User 1, has associated a particular content item, Content Item A, with a particular folder, Folder A. Based on this indication, at Step 320 the content repository will mark Content Item A as being associated with Folder A. As explained elsewhere, the marking of Content Item A as being associated with Folder A may be accomplished in a variety of ways using techniques known in the art, based on the selected implementation of the content repository in general, and the selected implementation of folders in particular. Steps 310 and 320 are envisioned to be performed any number of times, as users organize content items into folders that are useful to them.

At Step 330, a suggestion engine (for example suggestion engine 105 shown in FIG. 1) may receive an indication that User 2 has requested suggestions relating to Content Item A. This indication may be explicit, based, for example, on User 2 clicking a request button; it maybe implicit, based, for example, on User 2 placing a copy of Content Item A in a folder in the content repository; it may be triggered, based, for example, on an event occurring within the suggestion engine or the content repository or on User 2's computer; or it may be independent of any triggering event and instead based on algorithms within the suggestion engine that automatically provide suggestions relating, for example, to new content items deposited into the content repository.

In response to a user request for suggestions, to a triggering event, or to an automated suggestion-generating process, the suggestion engine may then, at Step 340, select one or more relationships between Content Item A and other content items in the content repository, in order to identify potential content for suggestion to User 2. The specific set of relationships can be user-selected. Alternatively, they can be determined by the suggestion engine based on a variety of factors, including user preferences, the preferences of other users, the characteristics (for example, properties) of Content Item A itself, the characteristics of the relationships (for example, relationships that have previously yielded many suggestions for Content Item A, have previously yielded high quality suggestions for Content Item A, i.e., suggestions that have been viewed and/or saved by users, or are computationally more efficient to evaluate with respect to Content Item A), as well as the characteristics of the content repository (for example, the size of the repository, the number and size of folders within the content repository, and the quantity and quality of suggestions previously provided for Content Item A, and other factors). The specific set of relationships can comprise, for example, any of the relationships described herein that are appropriate for Content Item A, and the relationships may be evaluated in any order.

Step 350 is where each of the relationships selected in Step 340 is evaluated in order to identify potential content suggestions. Note that the content repository software may pre-compute at least a portion of the evaluations of some relationships. For example, whenever users store new content items into the content repository, the content repository software may immediately determine the extent to which the new content items are related to other existing content items under one or more relationships. In such a case, embodiments of the invention may simply access the results of the pre-computed evaluation(s). Alternatively, embodiments may complete any remaining computations required of the evaluation(s) and then access the results.

The output of Step 350 is a set or pool of potential suggested content items that have satisfied at least one of the relationships selected in Step 340. From the pool of suggested content items produced by evaluating the selected relationships in Step 350, a number of content items may be selected and provided to User 2 in Step 360.

Figure 4:
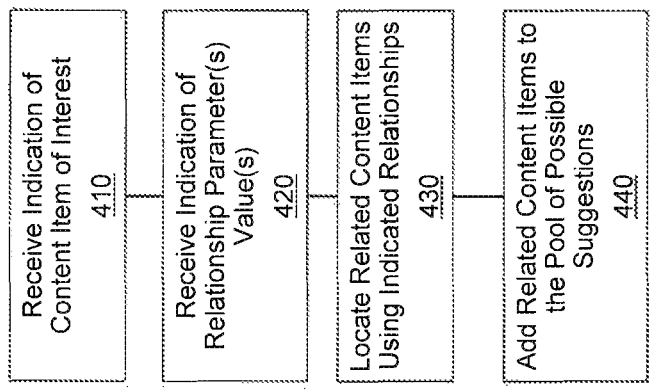
FIG. 4 illustrates an exemplary embodiment of a method for locating content items that are semantically related to a single content item, in accordance with the present invention.

FIG. 4 illustrates an exemplary embodiment of a method for locating content items that are semantically related to a single content item. In general, each of the following methods begins with Step 410, in which a suggestion engine (for example, the suggestion engine 105 shown in FIG. 1) receives an indication of a single content item of interest. Then, in accordance with a selected relationship, the suggestion engine receives at Step 420 an indication of a value for any parameter(s) that may be required to evaluate the selected relationship. For example, if the relationship "N(j)" is being evaluated, the suggestion engine may receive at Step 420 an indication of a value for the parameter "j," corresponding to the copresence threshold. Using the selected relationship and the appropriate parameter value(s) supplied in Step 420, the suggestion engine may then undertake Step 430 to locate at least some content items that are semantically related to the content item of interest by evaluating the selected relationship. At Step 440, the content items discovered in Step 430 are added to the pool of possible suggestions.

Each of the following suggestion generation methods applies to a single, specific content item of interest. Each of these single-content item methods follows the same general series of steps shown in FIG. 4.

Method 1.1: use relationship "N," as defined above.
a) A content item of interest is chosen.
b) At least some of the item's neighbors, using relationship N, are located. Note that these neighbors are content items, not folders.
c) These neighboring items are added to the pool for possible presentation to a user.

Method 1.2: use relationship "N(J)," as defined above.
a) A content item of interest is chosen.
b) A user specifies the value of an additional parameter: copresence threshold, j.
c) At least some of the item's neighbors using relationship N(J), are located. Note that these neighbors are content items, not folders.
d) These items are added to the pool for possible presentation to the user.

Method 1.3: use relationship "SY(p)," as defined above.
a) A content item of interest is chosen.
b) A user specifies the value of an additional parameter: copresence ratio p.
c) At least some of the item's synonyms using relationship SY(p), are located. Note that these synonyms are content items, not folders.
d) These items are added to the pool for possible presentation to the user.

Method 1.4: use relationship "JS(p)," as defined above.
a) A content item of interest is chosen.
b) A user specifies the value of an additional parameter: copresence ratio p.
c) At least some of the item's joint synonyms using relationship JS(p), are located. Note that these joint synonyms are content items, not folders.
d) These items are added to the pool for possible presentation to the user.

In embodiments, each of the single-content item methods above can be repeated for sets of content items (for example, all of the content items associated with a folder). In such embodiments, the resulting content items of each iteration of a method are combined (for example, by determining the union), and the combined content items are added to the pool for possible presentation to the user.

Methods for a Set of Content Items

Figure 5:
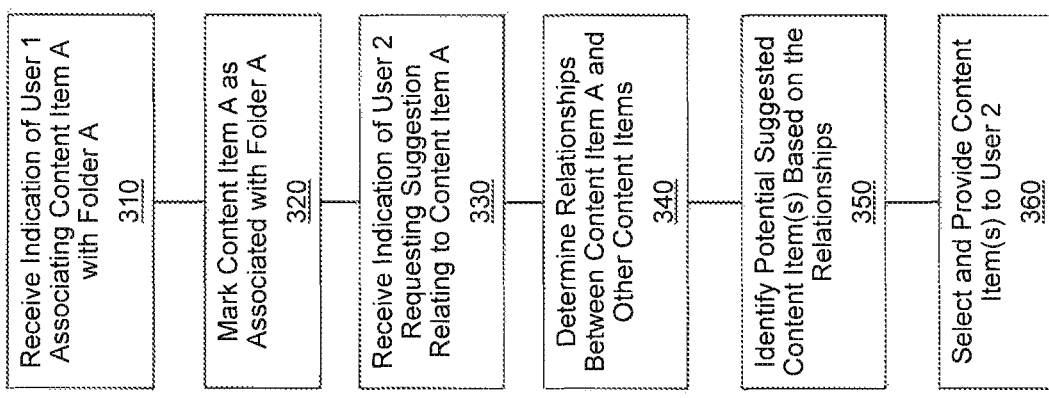
FIG. 5 illustrates an exemplary embodiment of a method for locating content items that are semantically related to a set of content items, in accordance with the present invention.

In contrast to FIG. 4, which focused on finding suggestions relating to a single specific content item, the method in FIG. 5 illustrates an exemplary embodiment of a method for locating content items that are semantically related to a set of content items. As in FIG. 4, the method of FIG. 5 begins at Step 510 when a suggestion engine receives an indication of a set of content items as a basis for generating content suggestions. The set of content items can be associated with a single folder or a combination of different folders. Then, in accordance with a selected relationship, the suggestion engine receives at Step 520 an indication of a value for any parameter(s) that may be required to evaluate the selected relationship. For example, if the relationship "H" is being evaluated, the suggestion engine may receive at Step 520 an indication of a value for the parameter "j," corresponding to the commonality count threshold. Using the selected relationship and the appropriate parameter value(s) supplied in Step 520, the suggestion engine may then undertake Step 530 to locate folders that are semantically related to the set of content items of interest by evaluating the selected relationship. At Step 540, the content items associated with the folders discovered in Step 530 are added to the pool of possible suggestions.

Each of the following suggestion generation methods applies to a specific set of content items. These set-based suggestion methods follow the same general series of steps shown in FIG. 5.

Method 2.1: use relationship "SP," as defined above.
a) A set of content items of interest is chosen.
b) At least some neighbor folders are located using relationship SP, based on the set of content items.

c) The items (other than the original set of content items) belonging to the folders obtained in the previous step are added to the pool for possible presentation to the user.

Method 2.2: Use relationship "H," as defined above.
a) A set of content items of interest is chosen.
b) The value of an additional parameter: commonality count threshold j is supplied.
c) At least some neighbor folders are located using relationship H, based on the set of content items, and the threshold value j.
d) The items (other than the original set of content items) belonging to the folders obtained in the previous step are added to the pool for possible presentation to the user.

Method 2.3: Use relationship "SS," as defined above.
a) A set of content items of interest is chosen.
b) The value of an additional parameter: commonality count threshold j is supplied.
c) At least some neighbor folders are located using relationship SS, based on the set of content items and the threshold value j. Note that, unlike Method 2.2, described above, Method 2.3 uses j as a threshold among the set of content items, and not among all the items in the folder.
d) The items (other than the original set of content items) belonging to the folders obtained in the previous step are added to the pool for possible presentation to the user.

Method 2.4: Use relationship "PSC," as defined above.
a) A set of content items of interest is chosen.
b) The value of an additional parameter: commonality proportion threshold r is supplied.
c) At least some neighbor folders are located using relationship PSC, based on the set of content items, and the threshold value r.
d) The items (other than the original set of content items) belonging to the folders obtained in the previous step are added to the pool for possible presentation to the user.

Methods for a Single Folder

Figure 6:
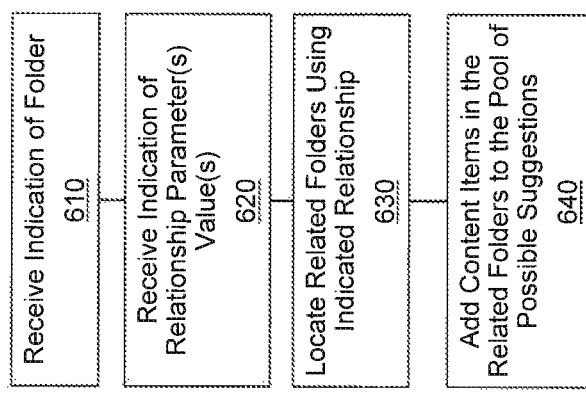
FIG. 6 illustrates an exemplary embodiment of a method for locating content items that are semantically related to all content items in a folder, in accordance with the present invention.

FIG. 6 illustrates an exemplary embodiment of a method for locating content items that are semantically related to a folder. The method of FIG. 6 begins at Step 610 when a suggestion engine receives an indication of a folder of interest as a basis for generating content suggestions. In accordance with a selected relationship, the suggestion engine receives at Step 620 an indication of a value for any parameter(s) that may be required to evaluate the selected relationship. For example, if the relationship "SU" is being evaluated, the suggestion engine may receive at Step 620 an indication of a value for the parameter "j," corresponding to the commonality count threshold. Using the selected relationship and the appropriate parameter value(s) supplied in Step 620, the suggestion engine may then undertake Step 630 to locate folders containing content items that are semantically related to content items in the folder of interest by evaluating the selected relationship. At Step 640, the content items discovered in Step 630 are added to the pool of possible suggestions.

Each of the following suggestion generation methods applies to a single folder as a basis for generating content suggestions. These folder-based suggestion methods follow the same general series of steps shown in FIG. 6.

Method 3.1: use relationship "SU," as defined above.
a) A folder is chosen.
b) The value of an additional parameter: commonality count threshold j is supplied.
c) The chosen folder's neighbors are located using relationship SU and the threshold value j.
d) At least some of the items belonging to the folders obtained in the previous step are added to the pool for possible presentation to the user.

Method 3.2: Use relationship "PC," as defined above.
a) A folder is chosen.
b) The value of an additional parameter: commonality proportion threshold r is supplied.
c) The chosen folder's neighbors are located using relationship PC and the threshold value r.
d) At least some of the items belonging to the folders obtained in the previous step are added to the pool for possible presentation to the user.

In the same or alternative embodiments, the suggestion generation methods above may use a "virtual folder" as a basis for generating content suggestions. A virtual folder is a temporary folder that is associated with a plurality of content items collated from a plurality of other folders. A user may, for example, create a virtual folder in an ad hoc manner by selecting two or more content items from one or more folders, by selecting two or more folders, or by selecting a combination of content items and folders in the content repository. Users or embodiments of the invention may also create virtual folders from non-folder collections of content items (for example, from the results of a web search or a search of the content repository). For purposes of evaluating any of the relationships discussed herein, a virtual folder may be treated the same as an ordinary folder.

Methods for a User

In addition to suggestion methods that operate on a single content item, a set of content items, and/or a folder, these same methods can be adapted, alone or in combination, to generate suggestions for a user, without first specifying or requiring a particular content item, set of content items, or folder containing content items. Any combination of the user's content can be identified and/or selected for use as a basis to generate suggested content. The combination of user content to be used as a basis data set can be selected by the user, by a suggestion engine based on user preferences, or by a suggestion engine based on a selected subset of the user's content items or the user's folders (for example, the folders that contain the most frequently or recently accessed folders and/or content items). Once the combination of user content is identified, any of the applicable methods discussed above for selecting and evaluating relationships to discover content suggestions can be employed.

Methods Based on Multi-Hop Neighbor Relations

As mentioned above, the concept of multi-hop neighbor relationships is derived from the other defined neighbor relationships. To generate multi-hop suggestions, all of the suggestion generation methods described above, with the exception of methods 2.1 and 2.3, can be implemented in the exact same manner as explained above, by replacing the relationship at the core of the method with its multi-hop counterpart. The multi-hop variants of the methods are capable of producing a broader set of results than the equivalent single-hop versions. In other words, the set of content items added to the pool using a multi-hop relationship can be a superset of the content items that would be added by an equivalent single-hop version of the relationship. This need not always be the case, however. Some multi-hop methods can elect not to add some content items discovered at one or more hops. For example, the content items (or folders) discovered at the first hop can be used merely to facilitate discovery of content items from only the second hop relationship.

Multi-hop variants can be used to:
(a) Expand a set of results when the user requests additional suggested content items. In such a case, the method does not necessarily conclude when initial results are returned to the user. Instead, the results for a certain number of hops are gathered and returned to the user. The execution of the method may be paused, and its state is preserved such that it can resume when desired. If and when the user exhausts the suggestions provided so far, and the user requests more, the method's execution can be resumed.
(b) Expand the set of results until a goal is met (for example, a certain number of content items is obtained).
(c) Reflect a specific choice by a user who is selecting the hop count, either directly or indirectly, via one or more parameters designed to modulate the breadth and variety of the suggestions. For example, a user can select a hop count to include not only neighboring folders in a hierarchy, but also sibling folders, etc.

Adaptive Multi-Hop Methods of Generating Suggestions

In case (c) above, a multi-hop variant may rapidly expand to generate a very large number of suggestions, as well as suggestions that may start to become less relevant as the hop count increases. Adaptive variants of each multi-hop method can be implemented to control the expansion of the neighbor space and help the suggestion engine's search converge. The general concept of the adaptive variants is to "make it progressively harder" for the method to traverse subsequent hops.

Adaptive multi-hop approaches are particularly applicable to methods that have threshold parameters. In such cases, the threshold parameters can be made more stringent as additional hops are traversed in the search.

As one example of a multi-hop adaptive strategy, any suggestions obtained from the methods discussed above can be constrained by requiring the copresence count of the suggestion with respect to a particular content item of interest (i.e., the number of times the possible suggestion is in the same folder as the content item of interest) to be above a certain value.

As another example of a multi-hop strategy, Method 3.2 above, which has a threshold parameter, r, may be applied to folder F to generate suggestions. Suppose that the value of r is calibrated (either directly or indirectly by user input, set as a default, or set by an algorithm that computes a recommended value) to an initial value of 0.25. This initial value is used for the first hop traversed by the method. A non-adaptive version of Method 3.2 simply continues to use the same value of r for each of the successive hops. Suppose that the first hop yields N folders that are neighbors of F by relationship PC. Then, on the second hop, the method searches for neighbors of each of those N folders. Suppose further that on each hop, an average of N new folders is found for each of the folders added on the previous hop. The total number of folders is $N^k$ (N to the k-th power), where k is the number of hops. This number can grow large quickly in a large information space, even for reasonably small values of r, since N can itself frequently be a large number, such as 100 or 1000.

In contrast, an adaptive variant of Method 3.2 may reduce the number of folders added at each hop by increasing the value of r that is applied as the number of hops increases. Thus, for example, the first hop might use r=0.25, the second hop r=0.30, the third hop r=0.4, and the fourth hop r=0.55. As r increases, the average number of new neighbors found for each folder may decrease. The method can be stopped when a variety of different conditions are met, including: 1) the number of content items added in the latest iteration is less than x % of the total content items accumulated by the method so far, where the threshold, x %, is a parameter of the algorithm, or a constant built into the algorithm; 2) the number of content items added in the latest iteration is less than a certain threshold; 3) the number of content items added in the latest iteration is less than x % of the content items added in the previous iteration, where the threshold, x %, is a parameter of the algorithm, or a constant built into the algorithm; and 4) the number of total content items accumulated so far has reached a pre-specified limit. Additional stopping conditions for the method can easily be imagined based on these examples.

Another variation of adaptive multi-hop methods available to embodiments of the suggestion engine involves modulating parameters that influence the number of next hop neighbors at each hop traversed by the search, but doing so as a function of the results obtained in previous hops of the algorithm's execution. For example, if the search produces a large number of new neighbors when a particular hop is traversed, then on the next hop, thresholds can be commensurately tuned to reduce the number of new neighbors that are likely to be obtained. Many different mathematical formulas can use the quantity of results so far (or just in the immediately preceding iteration, for example) as an input in order to tune the search parameters for the next hop, which in turn may increase or decrease the quantity of candidate suggestions that are obtained.

Note that in all of the adaptive methods described herein, the adaptations may be applied either: (a) independently along each multi-hop path that the method generates, taking into account properties of the path developed up until that point; or (b) uniformly across all the paths the method is generating, taking into account properties of the collective set of paths generated up until that point.

Changing Relationships Along the Path

All of the methods discussed so far, whether single-hop or multi-hop, make use of a single relationship to discover neighbors for content items or folders. However, another variation of multi-hop methods involves altering the relationship that is used at one or more hops along the generated paths. In the simplest case, a pre-programmed sequence of relationships can be applied to a fixed sequence of hops. For example, a method could be fixed at two hops, and could evaluate, in order: (a) relationship SS on the first hop; and (b) relationship PC on the second hop. An example of this two hop method could behave as follows:
a) Starting with an initial folder, $F_1$, and three content items $\{C_1, C_2, C_3\}$, the first hop traversal could lead to folders that contain at least 2 of the three content items.
b) Then, for each folder, $F_i$, obtained via the first hop, the second hop traversal could use relationship PC(0.2), for example, to locate folders $F_j$ where the intersection of $F_i$ and $F_j$ contains at least 20% of the content items contained in $F_i$.

In other cases, the sequence of relationships can be determined dynamically based on factors such as user selection or preference, random variation, the number of suggestions generated thus far by other methods, and other factors known in the art. When selecting relationships to be evaluated at each hop of a multi-hop sequence, embodiments of the invention may first select a relationship from one entity class and then select a relationship from another entity class. For instance, the first hop could employ a folder-to-folder relationship. Then the content items issuing from that step could be used as inputs to an item-to-item relationship in the second hop.

Suggestion Constraints

In certain circumstances, users of embodiments of a suggestion engine described herein may wish to exercise additional control over the way in which suggested content items are selected. A number of constraints can be specified to enhance the accuracy of the selection process. Such constraint parameters refer to desirable, or conversely, undesirable, properties of candidate content items. In general, any property of the content items in the information space can be used for the purpose of specifying constraints.

Any suggestion generation method, such as those described in preceding sections of this document, can be combined with constraints. A simple way to apply the constraints is to run the method in its normal fashion, and prior to adding a content item to the pool of suggestions, test the item against the constraint in order to make a final decision about whether it should be added. Alternatively, a method can be run to generate all of its suggestions as it normally would, and then the pool of suggestions can be filtered based on the specified constraints.

For example, a constraint can generally be specified by:
(a) identifying one or more properties of interest that belong to some or all content items;
(b) stating which criteria are to be used to test the one or more properties; and
(c) stating how the test result should be interpreted by the suggestion engine (for example, reject or accept the item).

Constraints may be selected and/or invoked by individual users, or they may be built into one or more of the various algorithms employed by embodiments of a suggestion engine to generate content suggestions. In the latter case, users may exhibit some control over the constraints through preferences and/or controls available to the user via a user interface (for example, the Suggestion Assistant described further below).

Properties are generally one of two types: independent or contextual. Independent properties are those that pertain to characteristics of the content item itself, while contextual properties are those that pertain to characteristics of the content item with respect to one or more other content items and/or folders. An exemplary independent property is the type of the content item such as, for example, whether the content item is a document, a web page, an image, a video, etc. An exemplary contextual property, on the other hand, is a suggestion acceptance count, i.e., a count of the number of times that any user saved the content item after it was offered as a suggestion with respect to another content item or folder.

Suggestions may be constrained by both independent and contextual properties in a variety of ways depending on the types of properties. For example, properties may be tested or evaluated against keywords, expressions, integer values, percentages, and changes in values over time (i.e., trends). Two or more properties may also be evaluated together for more complex constraints. For example, a suggestion acceptance count may be combined with a date-time stamp to include only those suggested content items that were saved by a certain number of users, and also saved at least once in a time period deemed to be sufficiently recent.

The following are some examples of constraints:

Keyword or expression presence. To satisfy a keyword or expression constraint, a suggested content item must contain a specified keyword, a set of keywords, a specific phrase, or a text string, such as a regular expression. All of these are standard criteria used by search engines to test content for relevance, and this type of constraint specification and application is well understood. In embodiments, a keyword or expression presence can be required of a particular sub-part of a content item, such as a page title, a synopsis, any type of tag, or the main body of the content item. Alternatively, the requirement may apply to an entire content item and/or all of its parts (i.e., any part could satisfy the constraint), or any combination of its parts.

Date-time stamp. To satisfy a date-time stamp constraint, a suggested content item's date of creation must be more recent (or conversely, older) than a certain date-time stamp. Assuming at least some items in the information space have date-time stamps indicating when they were created, the constraint allows users to filter out items that are too old (or conversely, too recent). The same type of constraint can be applied to other date-time stamps, such as: "last update time or modification time"—the time when the item was most recently changed; "first save time"—the time when the item was first added to the information space; "last save time"— the time when the item was last saved by a user; and in general, any date-time stamp that describes a useful aspect of the content item's history.

Quality rating. A quality rating constraint may refer to an independent or contextual quality-related property. In the independent sense, the quality of a content item may refer to its general quality or popularity. For example, a content item may be associated with a corresponding user-rating (such as a numerical score or star rating), indicating how much it is liked by users who have viewed and rated the content item. In the contextual sense, the quality of a content item may refer to how well the content item has been received as a suggestion for another content item. For example, if a content item has been saved by 90% of users who have viewed the content item as a suggestion for another particular item, it may be considered a high quality suggestion for that particular item. In either the independent or contextual cases, the quality rating constraint can be satisfied if a suggested content item has a quality rating that exceeds a specified threshold. Ratings from multiple users can be aggregated to create an overall quality rating. A user who is receiving suggestions may, for example, specify a quality constraint of 4 out of 5 stars, meaning that only content items with 4 stars or more will be delivered as suggestions.

View history. To satisfy a view history constraint, a suggested content item must not have been seen by a user (for example, viewed by the user using the normal browsing application used for this purpose) within some specified period of time prior to the suggestion request. Alternatively the constraint may require the opposite, meaning that the user must have viewed the content item during a specified period of time, such as the previous 30 minutes.

As mentioned above, any property of a content item may be used for constraint purposes. For purposes of illustration only, some additional examples of constraints are provided below, and one of ordinary skill in the art will recognize that these constraints may correspond to independent properties, contextual properties, or both.

Visited count—a number of times users have visited/ viewed a content item.

Save count—a number of times users have associated a content item with a folder, or more simply put, the number of folders associated with a content item.

Saved suggestion count—a number of times users have saved a content item after it was offered as a suggestion.

Suggestion acceptance count—a number of times users have saved a content item after it was offered as a suggestion with respect to a particular content item, set of content items, or folder.

Suggestion acceptance ratio—a ratio of the suggestion acceptance count for a content item to the number of times the content item was offered to users as a suggestion.

Blacklisted count—a number of times users have blacklisted (i.e., indicated that they do not want to see the content item as a suggestion in the future, and/or that they do not want the item displayed in search results in the future) a content item, thereby indicating that the content item is irrelevant or uninteresting.

Blacklisted relationship count—a number of times users have blacklisted a content item after it was offered as a suggestion with respect to a particular content item, set of content items, or folder.

Ignore count—a number of times users have ignored (i.e., did not visit or view) a content item after it was offered as a suggestion.

Ignore relationship count—a number of times users have ignored a content item after it was offered as a suggestion with respect to a particular content item, set of content items, or folder.

Save rate—a measure of the rate at which a content item has been saved over a period of time (for example, an average of 10 times per hour over the last 24 hours). Other examples similar to this constraint include measures of the rate at which a content item has been previewed, viewed, ignored, deleted, blacklisted, etc. over a period of time.

Deleted count—a number of times users have deleted a content item, i.e., dissociated the content item with a folder.

Link traversal count—a number of times users have traversed a link between a first content item and a second content item that is offered as a suggestion for the first content item. The link traversal count can include the number of traversals from the second content item to the first content item, the number of traversals from the first content item to the second content item, or both. Such traversals can, for example, be captured by embodiments of the Suggestion Assistant described below.

Red flag court—the number of times users have marked an item as offensive, obscene, or otherwise inappropriate. Content items for which the red flag count has reached a certain threshold may automatically be excluded from all further suggestions.

Figure 7:
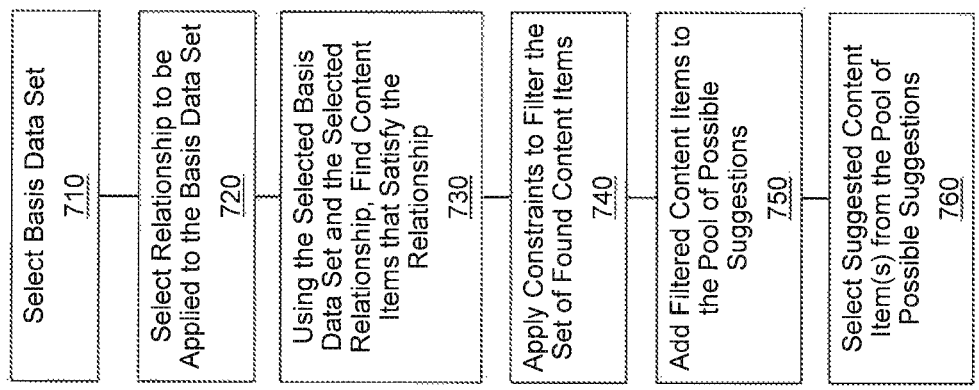
FIG. 7 illustrates an exemplary embodiment of a method for applying constraints to a pool of possible suggestions, in accordance with the present invention.

FIG. 7 illustrates an exemplary embodiment of a method for applying constraints to a pool of possible suggestions. The method begins at Step 710 with selection of a basis data set. The basis data set can be a single content item, a set of content items, or a folder. At Step 720, the specific relationship to be evaluated is selected. Then at Step 730, the selected relationship is evaluated with respect to the basis data set and the appropriate content items in the content repository, to locate content items that satisfy the relationship. At Step 740, each of the located content items is evaluated against one or more constraints. The content items that match the constraint(s) are added to the pool of possible suggestions at Step 750. Finally, at Step 760, suggested content items can be selected from the pool of possible suggestions.

Synonym Interchangeability

Synonym interchangeability is a principle stating that, if two content items appear together sufficiently frequently, then for the purposes of certain analyses, one content item may act as a substitute for the other. The desired frequency threshold is the parameter "p" for the relationship "SY" defined previously. This parameter may be set as a constant, or selected by a user, an administrator, or an algorithm that has a specific goal for making use of the concept of interchangeability. For example, if the parameter is set to the value 0.95, and if $C_2$ appears in at least 95% of the folders in which $C_1$ appears, then $C_2$ will be identified as a synonym of $C_1$, or using relationship terminology, $C_1:SY(p):C_2$. With this fact established, certain analytical functions of the suggestion engine may choose to consider $C_1$ and $C_2$ to be interchangeable.

At the folder level, a folder $F_x$ may contain $C_1$, but not $C_2$; and a folder $F_y$ may contain $C_2$ but not $C_1$. Then, as an optional feature of embodiments of the present invention, a method such as Method 1.1, described above, may allow the $C_1$ belonging to $F_x$ to be substituted for a $C_2$ for the purpose of evaluating the SU(1) relationship. With this substitution in place, both folders can appear to contain $C_2$, such that $F_x:SU:F_y$.

Note that the terms "substitute" and "substituted," above, are used somewhat loosely. In reality, when a synonym interchangeability option is enabled for a method, the method can take a temporary action to evaluate the folder as if it contained the substitute. The substitution step can be implemented in at least two ways:

(a) at least temporarily replace the original item with its synonym; or (b) add the synonym to the folder, such that both items are present simultaneously.

Enabling synonym-based substitution can allow any of the suggestion engine methods to include a broader set of candidates for offering suggestions to users. If the parameter governing the synonym relationships is tuned to be sufficiently high, the suggestion relevance is expected to generally still be good while providing an opportunity to find additional valid suggestion candidates.

Note that the two different synonym relationships SY and JS can lead to different results for suggestion generation methods that employ substitution. Recall that relationship SY is not symmetrical. $C_1:SY(p):C_2$ means that $C_2$ appears in (p*100)% of the folders that contain $C_1$. However, a vastly greater number of folders could contain $C_2$, without also containing $C_1$. One interpretation of such a situation is that $C_2$ can act as a good substitute for $C_1$, since it is highly likely to appear wherever $C_1$ appears; however, the converse may not be true; that is, $C_1$ may not act as a good substitute for $C_2$. On the other hand, relationship JS is symmetrical and therefore can be used to establish bidirectional interchangeability of content items.

Template for Additional Suggestion Generation Methods

The set of suggestion methods presented herein is not exhaustive. To construct additional methods, the following general template approach may be followed:

(1) Select a basis data set.

(2) Select a relationship that can be evaluated with respect to that basis data set. The term "relationship" is inclusive of any variants that extend or alter the way in which the relationship relates neighbors to each other (for example, multi-hop, use of synonym interchangeability, etc.).

(3) Using the basis data set and the relationship, find the entities (folders or content items) that satisfy the relationship.

(4) If any constraints are enabled, apply the constraints to filter the set of entities.

(5) If the located entities are content items, add them to the suggestion pool.
(6) If the located entities are folders, add the content items contained in those folders to the suggestion pool, except for any items that are already found in the basis data set.

The template approach above can be applied to any of the relationships disclosed above, either explicitly, as a broad class of relationships, or to any other relationships known in the art. In each case, the result is a method for generating suggestions whose characteristics are based on the properties of the selected relationships and constraints.

Varying Suggestions

Embodiments of the suggestion generation methods discussed above add one or more suggested content items to a pool of suggested contented items. The pool may be very small (for example, only several content items) or very large (for example, hundreds or thousands of content items). Accordingly, because of display constraints, a user may only be able to see a subset of the pool at any one time, but be able to request more suggested content items on demand. The order in which suggested content items are presented to the user may thus influence how often suggested content items are ever seen by users.

Embodiments of the invention may be configured to vary suggestions to users based on a variety of factors. Variation decreases the likelihood that the suggestion engine will present the same suggestions to a user at different points in time under similar circumstances. Variation methods can be applied at the time suggestions are added to a pool of suggestions and/or at the time when suggestions are selected from the pool and presented to the user. Specific variation methods may be selected and/or invoked by individual users, or they may be built into one or more of the algorithms employed by embodiments of the invention. In the latter case, users may exhibit some control over the variation methods through preferences and/or controls available to the user via a user interface (for example, the Suggestion Assistant described further below).

The following are some example variation methods:

Random variation. A random variation method selects suggested content items randomly from the pool of suggestions or applies a random test to select or discard suggestions as they are being added to the pool. Random variation methods can be combined with other variation methods.

Date-time stamp. A date-time stamp variation method uses a content item's date-time stamp property to vary suggestions. For example, such a method may randomly filter content items from the pool of suggestions using a weighted coin toss algorithm in which content items that have been saved more recently are less likely to be discarded.

View history. A view history variation method uses a user's view history property to vary suggestions. For example, such a method may filter from the pool of suggestions any content items that have been seen by a user within some specified period of time.

Synonym variation. A synonym variation method selects synonyms of suggested content items and presents the synonyms in conjunction with or in alternative to the suggested content items. For example, such a method may select synonyms of suggested content items and present them to a user when the user has already seen the suggested content items.

Score bands. A score band is a series of value categories, such as TOP, HIGH, MIDDLE, LOW, and BOTTOM, which serve as a way of simplifying a range of actual score values. Scores can be used to represent various properties of content items such as the quality or popularity of particular content items. For example, as discussed above with respect to the quality rating constraint, a numerical score or star rating may be used to indicate how much a particular content item is liked by users who have viewed and rated the content item. A score band variation method varies suggestions by selecting content items from one or more of the bands using an algorithm such as a weighted round-robin algorithm. For example, a score band variation method might select five content items with scores in the "TOP" band for every one content item with a score in the "BOTTOM" band. In this manner, a user is more likely to see suggested content items with higher scores, but suggested content items with lower scores may still be given an opportunity to be offered to users, and ultimately, receive increases in their scores.

Prioritizing Suggestions

In addition to varying suggestions, it may be desirable to prioritize certain suggestions for a variety of reasons. For example, users might be more interested in a suggested content item that has a statistically strong relationship to an item of interest than a suggested content item that has a statistically weaker relationship to the item of interest. In another example, users interested in news may want to receive suggestions for breaking news stories of national or international significance, even if those stories have not yet been saved by many users. Similarly, content items with very high save rates over a recent period, but relatively low save counts, may serve as better suggestions than content items with low save rates over a recent period, but high save counts. Or, there may be simply be content items that deserve a chance to become more popular, but are at risk of being overshadowed by content items that have been in the content repository for longer periods of time.

Methods for prioritizing suggestions can be applied at the time suggestions are added to a pool of suggestions and/or at the time when suggestions are selected from the pool and presented to the user. Specific prioritization methods may be selected and/or invoked by individual users, or they may be built into one or more of the algorithms employed by embodiments of the invention. In the latter case, users may exercise some control over the prioritization methods through preferences and/or controls available to the user via a user interface (for example, the Suggestion Assistant described further below).

Prioritization methods may prioritize content items by increasing the likelihood or guaranteeing that a content item will be selected from a pool of suggestions. Prioritization methods may also affect the ordering of suggestions so that higher priority suggestions are presented to a user before lower priority suggestions. The prioritization methods may assign and update a content item's priority, for example, based on a numerical scale of 0-10 or priority levels such as low, medium, and high. Prioritization methods may also operate in conjunction with variation methods in selecting suggestions to present to users.

The following are some example prioritization methods:

Strength of relationship. A strength of relationship prioritization method assigns priorities to content items based on the statistical strength of the relationship between the content items and other content items, sets of content items, or folders of interest. In other words, priorities may be assigned according to the degree by which relationships exceed specified thresholds, ratios, or other parameters associated with relationships. For example, a content item that satisfies an $N(j)$ relationship and exceeds the threshold $j$ by a factor of 10 may be assigned a higher priority than a content item that satisfies the relationship but only exceeds the threshold j by a factor of 2.

User preference. A user preference prioritization method assigns priorities to content items that, based on their properties or other metadata, correspond to user preferences. For example, a user may specify that he or she prefers content from certain sources or by certain authors. Content items matching these preferences are assigned higher priorities, and are therefore more likely to be presented as suggestions, than content items not matching these preferences.

Save rate. A save rate prioritization method assigns priorities to content items according to their save rates and any corresponding policies established by users or embodiments of the invention. For example, a policy may specify that content items with very high save rates over a particular period of time, but low save counts, be given higher priorities than content items with only high save counts, but low save rates over the same particular period of time.

Infancy. An infancy prioritization method assigns priorities to content items based on how recently they have been first saved by any user. For example, such a method may assign a higher priority to a content item that was first saved by any user within the last hour than a content item that was first saved by any user several weeks ago. In this manner, users may be more likely to discover content that, simply by being new, has not yet had a chance to be saved by many users.

Additional prioritization methods may be contemplated by one of ordinary skill in the art based on properties of content items, relationships, and combinations thereof without departing from the scope of the invention.

Avoiding Stale Suggestions

Embodiments of the invention may also be configured to avoid stale suggestions. A stale suggestion is a content item for which one or more of its properties indicate that the item is outdated, unpopular, no longer relevant, or generally a lesser quality suggestion. For example, a downward trend in its save rate or an upward trend in its deleted count may indicate that the content item is stale. In some embodiments, stale suggestions can be avoided by filtering them out as suggestions are being added to a pool of suggestions and/or at the time when suggestions are selected from the pool and presented to the user.

Staleness-avoidance methods may be selected and/or invoked by individual users, or the methods may be built into one or more of the algorithms employed by embodiments of the invention. In the latter case, users may exercise some control over the staleness-avoidance methods through preferences and/or controls available to the user via a user interface (for example, the Suggestion Assistant described further below).

The following are some examples of techniques to avoid stale suggestions:

Date-time stamp. To avoid stale suggestions using a date-time stamp, a date-time stamp threshold can be used to filter out suggestions that have not been saved by any user within some recent period of time. Similarly, embodiments of the invention can create a date-time stamp "window" that restricts suggestions to a bounded date-time range, and then move that window over time.

Save rate. Because the save rate may indicate the rate at which the popularity of a content item is increasing or decreasing over a period of time, this property can be used to filter out suggested content items that have become stale. For example, if fewer people are saving a content item today than were saving the content item a week ago, such behavior can be considered a downward trend in popularity. Such a content item may be considered stale if its save rate drops precipitously over a short period of time or gradually over a long period of time.

Using Archived Content to Generate Suggestions

For efficiency purposes or otherwise, embodiments of the invention (for example, the content repository) may store links (for example, URLs) to content items instead of the content items themselves. These linked content items (for example, web pages) may include dynamic content that can change or even disappear over time. Embodiments of the invention thus enable users to save linked content items in one of two ways. If a user wishes to save a linked content item for its general content (for example, a blog or news web page that changes frequently), then the user may choose to save only the link. Alternatively, if a user wishes to save a linked content item for its specific content at the time it is saved (for example, a specific news article), the user may choose to save a static version or "snapshot" of the content item in addition to the corresponding link. In some embodiments, the content repository may employ an algorithm to automatically make this election on behalf of the user, for example, based on how frequently the item has been observed to change throughout its history in the repository.

Where a content item in the information space changes multiple times, there may thus be multiple versions or snapshots of that content item saved by one or more users. In an embodiment, each one of the snapshots is stored as an independent content item, meaning each snapshot may be associated with its own folders and have its own relationships. Accordingly, the suggestion generation methods discussed above may identify one or more snapshots of a content item independently of other snapshots of the same content item. In addition, the suggestion generation methods discussed above may be applied independently to the separate snapshots in order to provide suggestions that are relevant to each of them.

While it may be desirable to save different snapshots for a content item when the differences among the snapshots are significant, it may be undesirable to do the same when the changes are trivial (for example, where a date stamp within a content item updates on a daily basis, but the remainder of the content is static). Accordingly, embodiments of the invention may compare a snapshot that a user wishes to save with other existing snapshots to determine whether there are any non-trivial differences. Such a comparison may be performed by conventional tools for comparing two documents, web pages, etc. If the differences are trivial, embodiments may save only a previous snapshot of the content item. If the differences are significant, however, embodiments may save a new snapshot of the content item.

In the same or alternative embodiments, snapshots may be saved with pointers to other snapshots of the same content item. Or, in another embodiment, all snapshots for a particular content item can be saved under a common identifier for that content item. In either implementation, alternative versions of a content item may be provided to a user as part of a single suggestion. For example, a suggestion that includes a snapshot of an older version of a content item may include a link to a more recent or current snapshot of the content item, thereby permitting the user to quickly jump between versions.

Handling Multiple References to the Same Content

Just as web pages and other dynamic content can change over time, so can their corresponding addresses in the information space, also referred to as links (for example, URLs on the World Wide Web). For example, a web page may be moved to a new location, leaving the old URL pointing to empty content. There may also be multiple current links corresponding to the same content. For example, a web server may "redirect" a request comprising a shorthand or alternative link for a web page to the actual link for the web page. Additionally, a single web page or other content item may comprise multiple versions that are each dependent on, for example, whether a user views the content item from a desktop or mobile device. In such a case, a web server may redirect a request for a desktop version (accessible via a first link) to a mobile version (accessible via second link), and vice versa.

As discussed above, content items may comprise links to various resources, thereby permitting embodiments of the invention to store dynamic content such as web sites and/or web pages according to their links. For example, in one such embodiment, when a user saves or associates a web page with a folder, the content repository may mark the web page's corresponding link as being associated with the folder. Accordingly, it is conceivable that users may save two or more different links corresponding to the same web page as independent content items. In some embodiments, treating different links corresponding to the same content as separate content items may skew the suggestion generation methods in undesirable ways. For example, the content may be less likely to be suggested because the relationships associated with each content item will be evaluated separately. Alternatively, a user might receive the same content as two separate suggestions. In some embodiments, the suggestion engine may address these behaviors by identifying instances in which two or more links correspond to the same content item and consolidating the links to a single content item with one or more aliases (i.e., alternative links for the content item).

In one such embodiment, the content repository may first determine that two links correspond to the same content item by intercepting browser communications. For example, a plug-in, extension, or other software component (such as a Result Organizational Tool described below), may interface with a browser to intercept communications between the browser and a web server. Such communications generally include both the originally requested link and the redirected link. The intercepting software may then transmit both links to the content repository.

In the same or an alternative embodiment, the content repository may search through all of its stored links, looking for links with similar elements. For example, the difference between two links corresponding to a desktop version of a web page (for example, www.yahoo.com) and a mobile version of the same page (for example, m.yahoo.com) is often very insubstantial and easily identifiable by a pattern-matching algorithm. The content repository may perform such a search on a periodic basis or on demand when a user saves a link.

Once the content repository receives and/or identifies two or more links to the same content, it may select one link as the primary link (for example, the link to which other links redirect, if there is such a link), and it may store the other links as alias links together with the primary link. For example, the alias links may be stored as an attribute of the primary link. If this is the first time saving any of the links, then no further action is necessary. If two or more of the links have previously been saved, then the content repository may merge the properties and any other data associated with the previously saved links, store the data with the primary link, and delete the non-primary links.

Logical Persistence of Content Items and Related Data

Embodiments of the invention are able to store, or more specifically to provide logical persistence services for, several broad classes of information relating to content items. The term "logical" refers to which information is to be persisted and maintained and the conditions under which it is accessed, not the specific mechanisms (for example, a database) that may be used to store and manage access to the information, or even the actual form of any underlying data structures. Many different design choices could be made with respect to data store functions, while still respecting the same logical storage design. Such choices are well known by persons of ordinary skill in the art.

Embodiments of the invention support at least three primary objectives for logical information persistence:

Objective 1: Persist all information saved by users so they can retrieve, inspect, and modify that information. User-saved information includes content items saved by users, as well as user-specific data, such as personal preferences, personal configurations, personal settings, and personal account data.

Objective 2: Persist information that reflects user behaviors and indications with respect to their manipulation of content items and/or suggestions. The behaviors and indications may include personal information and/or anonymous information. The behaviors/indications may be explicit (for example, a user dismisses a suggestion, indicating she is not interested in it); or they may be implicit (for example, a user previews a suggestion, but then shows no further interest in it, neither clicking through to the web page, nor saving the corresponding link). This information often takes the form of metrics, characterizing user behaviors with respect to their manipulation of content items in the data store. The metrics can include aggregations of user behaviors and indications across many or all users in the system.

Objective 3: Persist information that is derived from a user population's saved data, such as data described in Objective 1, as well as behavioral/indication data described in Objective 2. The purpose of derived information is to accelerate algorithms and decisions needed to support certain features of a suggestion engine system. For example, an algorithm for providing suggestions to a user with respect to certain content may require the inspection and use of data associated with many objects in the data store. If part or all of the analysis of these objects can be performed in advance and then stored, the algorithm that provides suggestions can run much faster, which may be necessary to make the algorithm sufficiently responsive to be useful when accessed by live users via a user interface.

User Data

User data reflects information that embodiments of a suggestion engine system may have saved about a user. The primary components of user data are enumerated below and described from a user's perspective:

My folders and their content. My Folders and their content may include a user's content items, as well as the user's folders containing both content items and other folders in a nested fashion. Each folder may have a unique ID. The content of a folder may be represented as a set of IDs, where each object (for example, a content item) has its own ID. The IDs may identify the objects of interest within the data store or content repository.

My data items. My data items may include a user's content items, web links, rich text documents, images, saved notes, emails, and other types of objects. Each data item may have a unique ID and may also carry information indicating which type of data item it is.

Common Elements. Certain data items are entirely personal to a user (for example, notes or annotations) and have nothing in common with the data items of other users. However, certain data items may contain some information that can be shared with other data items in the data store. For example, if two users have saved a data item of type "web link" referring to the same web page "www.sample.com", they may each have their own personal notes associated with the data item. However, the URL "www.sample.com" may be identical for both users and can be shared. The same is true for additional data that is proper to the URL and its associated web page, such as a the title of the page; or a summary derived from the page; or one or more images that are extracted from the page to serve as its visual representation; or metrics associated with the web page which may pertain to a community of users in general.

Common elements, such as URLs in the previous example, may be stored just once in the data store, given an ID, and referred to by other objects by using that ID. So, in the previous example, assume that user A and user B both save data items that are web links for www.sample.com. Then, in the data store, two data items, DataItem-A, and DataItem-B are persisted, one for user A and one for user B. A separate object called a "Link" (for example) is created to capture information that concerns www.sample.com, from a global perspective (i.e., not user-specific), and is given an ID, such as LinkID-1. DataItem-A and DataItem-B both contain a data member (for example, a field in a database, or a data structure member) indicating that their web link has ID=LinkID-1. This technique can also be applied to PDFs, images, or other types of documents that are in the public domain and of interest to multiple users.

My preferences, which govern the behavior of certain features that a user is given permission to control.

User Behaviors and Indications

Embodiments of the invention provide methods that permit a user to interact with various content items/objects/data items (these terms are used interchangeably). Information relating to user behaviors and indications with respect to the data items can be saved or persisted.

Saved information may include interactions with a user's own private data, such as data items the user has saved. For example, the system may keep track of how many times each user has accessed each saved item.

Saved information may also include user interactions with common elements. For example, embodiments of the invention may track the number of times that a particular web page was presented as a suggestion and also the number of times that the suggested web page was accepted (i.e., saved) by the user to whom it was presented. Since a web page is a common element, the counter can reflect the aggregate behavior of many users with respect to that item.

Furthermore, the same user interaction may cause an update to occur on both a private data item and a common element. Using the example above, when a user accesses a saved web page, not only can embodiments increment the count reflecting that particular user's behavior with respect to his own saved data item, but embodiments can also adjust the metrics associated with the common element (i.e., the web page) referred to by the user's data item.

Derived Data for Suggestion Analytics

Derived data would not be necessary if computers were infinitely fast at calculating, storing, and retrieving information. Since computers do not have those capabilities, and embodiments of the invention repeatedly need certain information within shorter time frames than the information could practically be calculated, some embodiments of the invention will compute certain information in advance, also known as "pre-computing."

In some cases, pre-computing is performed by embodiments via batch processes that may run periodically over appropriate portions of the data set in order to compute the desired result. The result is then stored and made available for any algorithm or feature that wishes to use it. Periodically, the batch processes can be executed again in order to obtain up-to-date pre-computed data.

In certain other cases, it is possible and economical, from a computational perspective, to maintain the desired information incrementally. This means that as changes are made to the state of the overall data store, the resulting changes in derived data can be calculated without having to recompute the entire derived data from scratch, as is typically done in the batch process approach. An example of a derived result is a summation of a certain field across all of the objects of a certain type. As long as the summation is saved and is correct, then when a new object is created, the summation algorithm merely has to add the contribution of that new object to the summation. Similarly, if an object of that type is deleted, the summation result merely has to be decremented by the contribution of the deleted object.

Certain information key to the operation of the data store may be saved by embodiments using the incremental technique described above. This information is, in particular, useful for the algorithms that compute suggestions for content that is considered to be likely to be of interest to users.

Copresence Counts

For example, a key relationship for suggestion analytics is the "copresence count" for every pair of content items. Two content items are considered "copresent" (also referred to as "neighbors") if at least one user has saved them both in the same folder. The number of times that this occurs, across all users, is called the "copresence count" for that pair of content items. For most potential pairs of content items this count will be zero, because most pairs of content items will not be stored together in the same folder by any user. In some embodiments, such copresence counts are not represented explicitly in the data store or content repository. The absence of a copresence count can imply that the value is zero.

Determining copresence counts for any arbitrary content item in the data store could require a vast number of read operations and calculations if the algorithm were to start from scratch. However, it may be desirable for the suggestion generation methods to quickly access the non-zero values for any content items. The question to answer is: "for content item A, what is the set of content items that have non-zero copresence counts with content item A?"

To support answering this question quickly, embodiments of the data store or content repository can maintain, with respect to every content item, a collection of all of related content items with non-zero copresence counts. The collection is actually a set of link IDs and associated copresence counts. This data can be maintained in an incremental fashion each time a content item is saved to a folder by any user, each time a content item is deleted from a folder, and each time a content item is moved from one folder to another. Similarly, when folder-level operations occur, such as a folder deletion, the copresence counts are appropriately adjusted for items that were contained by that folder.

Folder Set Information

Another critical relationship for suggestion analytics connects a content item to the folders that contain it or are associated with it. Since multiple separate users can independently save the same content item, this is a one-to-many relationship. In an embodiment, where a folder is said to contain a content item, it means that the folder contains or is associated with a data item referring to the content item. With this context, when analyzing a content item, one of the questions of interest is: "Which folders contain the content item?"

Computing this result from scratch would require a traversal of all the folders in the system to determine which ones contain the content item of interest. Since it may be desirable for the suggestion generation methods to acquire this information in a short time frame, embodiments can keep the information ready at all times by maintaining a "folder set" for each content item. A content item's folder set is maintained through incremental updates. Each time a content item is added to, or removed from, a folder, the appropriate information can be adjusted accordingly. Similarly, when a folder is deleted, it can be removed from the folder sets of all the content items that it contained immediately prior to its deletion.

Folder-Based Suggestions: First Example Method

In an earlier section describing methods for generating suggestions for a set of content items, Method 2.1 evaluated the "Specific Commonality Neighbors (SP)" relationship of a set of content items to find folders that contain a specific subset of the set of content items. When the content repository maintains folder set information for each content item (a list of which folders contain the content item), the task of finding the desired folders involves traversing the list of folders in the folder set. That is, the items of interest already "know" all of the folders that contain them. Then, for each item of interest, a folder-based suggestion method could compile all of the folder sets associated with the items of interest, and then compute the intersection of the folder sets to obtain a final set of folders to examine. The folder-based suggestion method could then extract the content items from the final set of folders, optionally rank each of them based on how many times it appeared across all of the folders in the final set, and add them to a pool of potential suggestions.

Another earlier section describes Method 3.1 for folder-based suggestions, which uses the "Sufficient Commonality Neighbors (SU)" relationship. This method does not rely on specific items, but instead considers the entire basis folder "F." The method discovers folders that contain at least j items in common with F. Of course, the various discovered folders need not all have the same intersection with F. This method can also take advantage of the availability of folder sets.

To find the desired folders, a folder-based suggestion method may begin by looping through all of the items in F, and for each item, obtaining its folder set. The collection of folder sets are then merged to produce a set of pairs where the first element in the pair is a folder, and the second element is the count of the number of times the folder appeared in all of the folder sets. The count must be at least 1, but it may or may not be greater than or equal to j, the threshold value. Folders having a commonality count less than j can be removed, since they do not contain enough of the original items in F to meet the required threshold. The remaining folders are the ones of interest. To produce items from the final set of folders, an additional step extracts the content items from the folders, optionally ranks the content items based on how many times they appeared across all of the final folders, and adds them to a pool of potential suggestions.

Folder-Based Suggestions: Second Example Method

Folder sets also allow suggestion generation methods in the embodiments to follow a content item to other folders. This is in contrast to the copresence data, which provides a way of traversing from one content item to other content items. In most cases, the goal of a suggestion generation method is to produce suggested content items and not folders. However, by propagating to other folders, it is possible to discover information that is not available merely through copresence counts. One such case occurs when providing suggestions for a set of content items, as opposed to an individual content item.

A special subcase of this capability would be, for example, providing suggestions for an entire folder. Suppose that the goal is to determine all of the content items that are copresent with any of the content items in a folder F, and to count how many times those content items are copresent. An algorithm could simply loop through all of the content items in F, and for each one, obtain the copresent links and their respective counts. Then, for each of the copresent content items, the algorithm could add up the counts that it had collected with respect to each of the content items in F.

However, if in another folder, there is a content item that is copresent with multiple content items that are in F, it may be undesirable to count that content item multiple times, as this would amount to redundantly accounting for the content item's presence within that folder. In other words, the content item would be present only once in the folder, but may be counted multiple times. Thus, copresence counts alone are insufficient to obtain an answer. The following simple example, using the following folders and their contents, illustrates the reason why:

F1 contains content items (A), (B)
F2 contains content items (A), (X), (Y)
F3 contains content items (A), (B), (X)

If the suggestion engine executes an algorithm to determine suggestions for folder F1, one approach would be to use copresence counts for the content items contained in F1. Doing so, the algorithm would determine the following:

A's copresent content items and counts are: (B=2); (X=2); (Y=1)
B's copresent content items and counts are: (A=2); (X=1)

When determining suggestions for folder F1, A and B are uninteresting for suggestion purposes, since they are already part of F1, leaving only X and Y. One must aggregate the data for content items that appear on behalf of multiple content items in F1. In this case, X is the only such content item because X is the only content item copresent with A and/or B and has a count greater than one.

The question now arises: should the count for X be 3, which one would obtain by adding the count on behalf of A to the count on behalf of B? Or, on the other hand, since X appears only twice throughout all the folders, should the count be 2? Both are legitimate answers with different interpretations, but suppose that one desires to adopt the latter approach, and not count X twice when it occurs in F3, merely because both A and B are present together in F3. Under this approach, there is insufficient information with just the copresence counts. Access to the folders themselves is required in order to detect that redundant counting would occur.

To complete the example, the following reasoning illustrates a way to obtain the desired copresent content items and aggregated counts for F1. First, begin with the folder sets, which are always maintained in a correct state.

A's folder set is: F1, F2, F3

B's folder set is: F1, F3

F1 is uninteresting, since it is the basis folder for computing suggestions, so the remaining folders of interest are the union of {F2, F3} and {F3}, which is {F2, F3}.

Looping through the content items contained in F2 and F3 to determine their total counts, counting each instance only once, results in:

A=2
B=1
X=2
Y=1

A and B are uninteresting since they are already in F1, and therefore are not useful suggestions. The remaining useful results are X=2 and Y=1.

As the two folder-based examples illustrate, pre-computed folder sets provide a useful tool to simplify and accelerate the generation of certain suggestions. Other suggestion methods can also leverage folder sets for their implementation, including for example, Method 3.2 above, which uses the "Proportionate Commonality Neighbor (PC)" relationship.

Data Store Consistency

Another important use for folder sets is for maintenance and consistency of the data store or content repository. When a content item that is a common element is deleted, it is necessary to update all of the data items that refer to that content item. Note that users would not normally be able to delete the common element representation of a content item since it belongs to many users. However, there may be times when the system itself decides to delete the common element. For example, if the content item's URL has become invalid as a result of the page or domain being removed, then embodiments of the suggestion engine system (for example, the content repository) may detect this fact, and then choose to delete the content item entirely. It may also be desirable for an administrator of an embodiment of the system to have the capability to delete a common element because it has been determined to be inappropriate for users to see. At that time, it is appropriate to either delete all of the data items that refer to the content item, or to mark them as having a special status so that users can be warned when the content item is displayed. Regardless of the specific policy, there is a need to traverse from the content item as a common element to all of the data items that refer to it. The folders that contain the data items would also be affected if the policy is to delete the data items. Obtaining the set of affected data items is easily accomplished by using the folder set of the deleted content item. Taking each folder in the folder set, the algorithm could simply identify the data item in each folder that refers to the deleted content item.

Selecting Folders for Content Items

As discussed throughout, when a user encounters a new content item (i.e., as a suggestion or otherwise), he or she may save the content item for future use. Because embodiments of a suggestion engine may possess semantic information about the content item (for example, the names of relevant folders in the content repository where the content item may be found, metadata concerning the content item and/or its associated folders, other content items in the related folders, and other information relating to the circumstances in which the folders and content items were created, including correlations between the new content item and the content items that have already been organized and saved in the folders), embodiments of a suggestion engine may recommend to the user a specific folder or set of folders, including a new folder or set of folders to be created, where the new content item may be saved, in order to be consistent with the user's organizational scheme. In the same or alternative embodiments, a suggestion engine may automatically select an existing folder or a new folder without user input. For example, when a user elects to save a content item, the suggestion engine may automatically save the content item to a specific folder (i.e., a new folder or an existing one) without requiring the user to make a selection.

Figure 8:
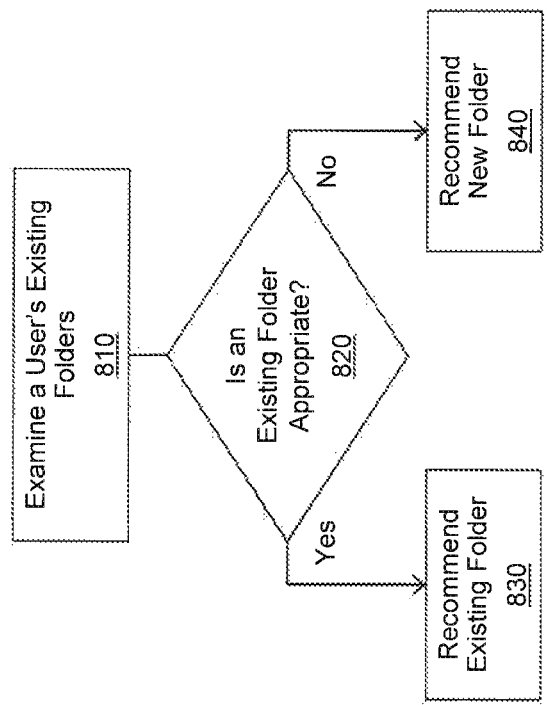
FIG. 8 illustrates an exemplary embodiment of a method that can be used to recommend or automatically select an existing folder or a new folder in which to save a content item of interest, in accordance with the present invention.

FIG. 8 illustrates an exemplary embodiment of methods that can be used to recommend or automatically select an existing folder or a new folder in which to save a content item of interest. At Step 810, the method may first evaluate a user's existing folders to see if any of them are a good fit for the content item. The folders can be evaluated, for example, by determining the copresence count for the content item of interest (i.e., the content item to be saved) with respect to each content item in each existing folder. By summing the copresence counts for each existing folder, one or more folders with the highest sums can be selected as the most appropriate destination(s) for the content item of interest.

At Step 810, copresence counts may be supplemented by also considering multi-hop neighbors. For example, a content item of interest and a content item from an existing folder may not be copresent (or may have a low copresence count), but each item might separately be copresent with a different common content item. In such a case, a "multi-hop copresence count" (i.e., the lesser of two copresence counts with a common content item) may be calculated. For example, content items A and B may have a copresence count of M, and content items B and C may have a copresence count of N. The lesser of M and N can be considered the multi-hop copresence count of A and C. If this multi-hop copresence count is sufficiently high, then the folder associated with C may be a good recommendation for A.

If the copresence counts are low for all existing folders, embodiments may use other methods for recommending an existing folder. For example, the suggestion engine can examine keywords (for example, from the title or snippet of a Web page) or metadata associated with the content item of interest as well as the content items in a user's existing folders. The suggestion engine can then look for similarities between the content item of interest and the content items in existing folders, and recommend one or more folders with sufficient similarities.

At Step 820, embodiments can determine whether it is appropriate, based on the evaluations performed thus far, to recommend an existing folder for saving a content item of interest. If an existing folder was located in Step 810, the method can proceed to Step 830 to recommend or automatically select that existing folder.

In some cases, however, embodiments may conclude at Step 820 that no existing folder is an appropriate destination for the content item of interest. Thus, at Step 840, embodiments may recommend saving a content item to a new folder. The name of the new folder may be derived from the content item's semantic information, including for example, the names of other users' folders that contain the content item of interest, keywords identified in the content item itself (for example, from the title or snippet of a Web page), or metadata stored with the content item of interest. In embodiments, the keywords and/or metadata may be compared with the other users' folder names to identify common words or phrases.

In an embodiment, all potential folder names, keywords, and/or common words or phrases can be processed by collating them, removing certain stop words, and creating a frequency table of 1-word, 2-word, 3-word, etc. phrases. Embodiments of the invention can search for overlaps among the phrases and retain only the overlapping words. For example, if three 2-word phrases contain one common word, then the phrases can be discarded in favor of the common word. Once the frequency table is populated, the phrase(s) with the highest frequency count(s) can then be recommended or automatically selected as the name(s) of the new folder(s).

When recommending new folders at Step 840, embodiments of the invention can implement privacy measures to remove private or personal names from use in generating potential folder names. For example, the suggestion engine may require a certain folder name, keyword, or phrase to appear a threshold number of times in the content repository before it can be suggested as a potential folder name. In this manner, if a user names his folder "Bob's Golfing Sites," "Bob's" would not be recommended or automatically selected as part of a potential folder name for another user unless "Bob's" appeared a sufficient number of times in other folder names, keywords, and/or phrases.

Returning back to recommending existing folder names at Step 810, embodiments may compare the high-frequency phrases with existing folder names, and if one or more suitable matches are located, recommend or automatically select them as existing folders for the content item of interest. In the same or an alternative embodiment, instead of comparing the high-frequency phrases to existing folder names, the suggestion engine may compare the high-frequency phrases with high-frequency phrases generated for each content item within an existing folder. Then, if some threshold number of content items within a folder are suitable matches for the content item of interest, the suggestion engine can recommend or automatically select the existing folder.

At Step 810, embodiments may also give priority to recently used folders when recommending an existing folder as the destination for a content item to be saved. A folder can be considered recently used, for example, if it was one of the previous N (where N is an integer) folders to which a content item was saved, if a user saved a content item to the folder within some period of time (for example, within the last 15 minutes), or a combination of these two criteria. When given priority, a recently used folder may be presented to the user before other recommendations and/or it may be analyzed more closely than folders that have not been recently used. For example, if the suggestion engine normally compares only the top 10 high-frequency word combinations to an existing folder name, then it might compare the top 20 combinations to the folder name of a recently used folder, thereby making it more likely that the recently used folder will be recommended or automatically selected.

In embodiments, a user can request a suggestion engine to organize all or a portion of the user's saved content items. For each content item supplied by the user, including a folder of content items or a hierarchy of folders of content items, embodiments of the invention can use any of the various teachings associated with FIG. 8 described above to recommend or automatically select folders in which to save the content items.

Suggestion Engine System Embodiments

FIG. 9 illustrates an embodiment of a Suggestion Engine System 900 in accordance with the present invention. The embodiment illustrated in FIG. 9 provides a Suggestion Engine 905 that interfaces with a Content Repository 910 to provide content suggestions to a user operating User Computer 915. Content Repository 910 is a collection of content items that may be provided by users, such as a user operating User Computer 915 or a user operating User Computer 920. As discussed above, Content Repository 910 may be structured logically as one or more folder hierarchies, where each folder (for example, Folders 925 and 930) may contain other folders (for example, Folders 927 and 928) as well as content items (for example content items A1, A4 and A5 shown in Folder 925). Other logical structures are also possible, as long as the structure enables users to group or organize content items together.

Content items in Content Repository 910 may be presented to a user in the form of a hierarchically organized set of groupings, stacks, directories, folders, or similar representations. As discussed above, Content Repository 910 can be implemented using various data structures, including any combination of trees, lists, graphs (cyclic or acyclic, hierarchical or non-hierarchical), databases, and/or other appropriate data structures known in the art. Storage and access methods for Content Repository 910 may be implemented using cloud-based techniques, which may further include distributed techniques where portions of Content Repository 910 (including mirror and backup copies) may be located on a plurality of computing devices, an example of which is illustrated as Computing Device 1000 in FIG. 10. Some user-specific portions of Content Repository 910 may be implemented on a user's own client device, such as a hard disk drive or equivalent device, but the same user-specific portions may also be implemented remotely or virtually using network and storage services known in the art, including cloud-based network and storage services.

Content Repository 910 may employ any type of internal structure or graph to organize content items based on user input. For example, the internal structure of Content Repository 910 may be implemented as a graph that is cyclic or acyclic. In addition, the internal structure of Content Repository 910 may be one or more hierarchical trees comprising progressive levels of narrower semantic scope. For purposes of illustration, Content Repository 910 is illustrated in FIG. 9 as a plurality of hierarchal trees of folders and content items. In this context, the term "folder" is intended to describe any such logical structures known in the art that support organizing and/or grouping content items. Those skilled in the art will recognize that a hierarchical tree is just one form of organized structure that may be used in the embodiments. Other structures are possible and are within the principles of the present invention.

Content Repository 910 may include interface software, including an application programming interface ("API") and related software methods that may permit users to access Content Repository 910 and interact with information stored therein.

As shown in FIG. 9, Content Repository 910 may include content items, such as A1, A4, and A5, which may be stored in or associated with folders, such as Folder 925. For exemplary purposes, content items A1 and A4 are shown in FIG. 9 as being commonly associated with multiple folders: Folder 925 and Folder 930. Folder 930 is additionally shown as being associated with content item A9, which is not found in any other folder. Content Repository 910 also comprises Folder 927 and Folder 928, both of which are shown as being contained within or associated with Folder 925. Folder 927 is associated with content items B1, B2, and B6. Folder 928 is associated with content item C1 (and later in the discussion will be associated with content items C3, and C7).

To add new content to Content Repository 910, a user may use a computer such as User Computer 915 to interact with a content source within Network 935. Network 935 may comprise one or more networks, such as a local area network, the Internet, or other type of network, including a wide area network and all types of wireless networks, such as wireless local area networks, and mobile data networks. In addition, Network 935 may support a wide variety of known protocols, such as the transport control protocol and Internet protocol ("TCP/IP") and the hypertext transport protocol ("HTTP"). In some embodiments, Network 935 may be implemented using the Internet.

Content sources (or information spaces) conceptually represent any collection of information provided by a publisher or other source of information. Content sources may comprise various types of content items, such as documents, multimedia, images, etc. Content sources may incorporate various types of storage, such as direct attached storage, network attached storage, and cloud-based storage to store and access information.

Search Engine 940 represents any system or application that is designed to search for information available on the Network 935. For example, Search Engine 940 may correspond to well known conventional search engines such as Google, Yahoo, Bing, etc., which commonly provide a user interface for searching and presenting search results. In general, Search Engine 940 may present search results in a list format or similar format.

User Computers 915 and 920 may be implemented using a variety of devices and software. For example, User Computers 915 and 920 may be implemented on Computing Device 1000 (FIG. 10), which may comprise a personal computer, laptop computer, mobile device, such as a smartphone or tablet computer, etc. User Computers 915 and 920 may comprise a memory and local storage (not shown in FIG. 9), such as a hard disk drive, flash drive, solid-state drive, an external disk drive, and the like. In addition, User Computers 915 and 920 may utilize various types of storage systems and services, such as network attached storage, storage area networks, and cloud-based storage services via Network 935 or another network.

User Computers 915 and 920 may run an operating system, such as the LINUX operating system, the Microsoft Windows operating system, the Apple iOS operating system, the Google Android operating system, and the like. User Computers 915 and 920 may also operate a Browser 945, such as Firefox by Mozilla, Internet Explorer by Microsoft Corp., Netscape Navigator by Netscape Communications Corp., Chrome by Google, or Safari by Apple, Inc.

User Computers 915 and 920 may also include software, such as a Suggestion Assistant 950, that enables users to interact with embodiments of the invention, for example to save content to Content Repository 910, to organize and view content within Content Repository 910, and to receive suggestions via Suggestion Engine 905. Suggestion Assistant 950 may operate alone or in conjunction with conventional Browsers 945 (for example, as a plugin or extension to Browsers 945). Suggestion Assistant 950 can be implemented as an application (including a mobile "app"), a program, a tool, a plugin, an extension, an interactive web page, a widget, or any other type of software.

In embodiments, Suggestion Assistant 950 includes a graphical user interface ("GUI") for rendering information to a user and/or receiving information from the user. The GUI may include any combination of user interface elements, such as buttons, windows, menus, text boxes, scrollbars, etc., for enabling users to interact with the embodiments. Users may use Suggestion Assistant 950 (either alone or in conjunction with conventional Browsers 945) to: browse content resources (for example, the Internet), view content items (for example, web pages), and/or conduct searches (for example, using Search Engine 940). Users may also use Suggestion Assistant 950 to: create folders (for example, Folder 928) in Content Repository 910, save content items (for example, Content Items C3 and C7) to folders (for example, Folder 928) in Content Repository 910, navigate and view collections of folders and content items (for example, Folder 925 and Folder 930 and their corresponding items), organize folders and content items (for example, to include copying, moving, deleting, renaming, and customizing folders and content items), and receive suggestions for folders and content items via Suggestion Engine 905.

In FIG. 9, for example, a user of Suggestion Assistant 950 on User Computer 920 has obtained Content Items 960 (C3 and C7). The Content Items 960, for example, may have been: discovered through use of a search engine, created by the user, shared by another user, presented as a suggestion, or acquired in any other manner. Using Suggestion Assistant 950, the user may then organize at least some of the received content items 960 by associating them with folder(s) within Content Repository 910, for example by associating Content Items 960 (C3 and C7) with Folder 928 (indicated by actions 970 and 975). The selected folder(s) correspond(s), at least in part, to the user's subjective categorization of the Content Items 960. The user content and folder structure (for example, Folder 928 and its contents) within Content Repository 910 may then be shared with, published to, or otherwise made accessible to, Suggestion Engine 905. Suggestion Engine 905 may then access content items within Content Repository 910 and provide new content suggestions to the same user or other users seeking new content.

In embodiments, users of Suggestion Assistant 950 may receive suggestions for folders and content items (including suggestions of folders in which to save content items) via Suggestion Engine 905 in a variety of ways. For example, the GUI of Suggestion Assistant 950 may include a dedicated suggestion window, which displays previews of suggested content items. The suggested content items may, for example, correspond to one or more folders and/or content items that a user viewed or selected. Users may then select one or more of the suggested content items for more comprehensive viewing and/or saving. In the same or an alternative embodiment, the GUI of Suggestion Assistant 950 may display suggested content items within tooltips, balloons, pop-up windows, or any other graphical container or textual representation. Such a display may include the content item's content and/or any associated attributes (for example, a text description, a corresponding image, a URL, etc.), including any subsets and combinations thereof.

In FIG. 9, for example, a user of Suggestion Assistant 950 on User Computer 915 has received Content Items 965 (A1 and B1) in response to a search request. Suggestion Assistant 950 may then provide content item A1 to the Suggestion Engine 905 as an item of interest along with a request for semantically similar content. Suggestion Engine 905 may then employ any of the suggestion-generation methods discussed above to locate available content items within Content Repository 910. For example, for content item A1, Suggestion Engine 905 may determine that Folders 925 and 930 also contain content item A1. And because Folders 925 and 930 also contain content item A4, Suggestion Engine 905 may then determine that content item A4 is sufficiently related to content item A1 to warrant suggesting content item A4 to the requesting user operating User Computer 915.

Following the same example, if Suggestion Assistant 950 provides content item B1 to the Suggestion Engine 905 along with a request for related content, Suggestion Engine 905 may determine that Folder 927 also contains content item B1. And because Folder 927 also contains content items B2 and B6, Suggestion Engine 905 may then determine that content items B2 and B6 are both sufficiently related to content item B1 to warrant suggesting content items B2 and B6 to the requesting user operating User Computer 915.

In embodiments, Suggestion Assistant 950 also collects additional information from users and from user interactions with content items, including content items provided to the user as suggestions, and Suggestion Assistant 950 may communicate this information to Suggestion Engine 905. For example, users may supply various preferences and other parameters that the Suggestion Engine 905 may use to provide user-specific suggestions. Suggestion Assistant 950 may also collect and communicate information about the content items a user views, the order in which the user views the content items, the time the user spends viewing each content item, and other metrics or observations pertaining to the user's interactions with content items that may be useful to Suggestion Engine 905 in providing suggested content.

Computing Device

Figure 10:
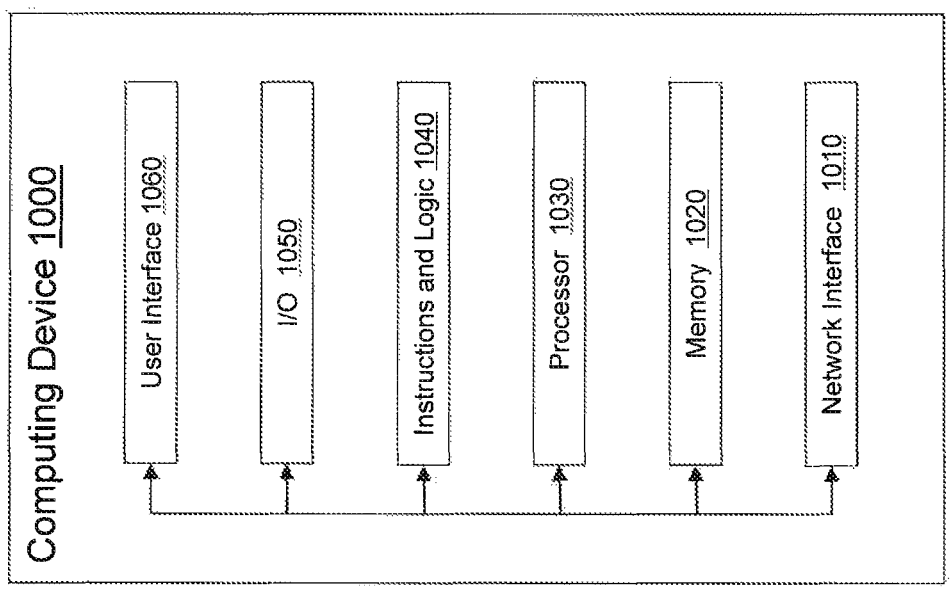
FIG. 10 is a block diagram of an exemplary embodiment of a computing device, in accordance with the present invention.

FIG. 10 is a block diagram of an exemplary embodiment of a Computing Device 1000 in accordance with the present invention, which in certain operative embodiments can comprise, for example, the Suggestion Engine 905, the Content Repository 910, User Computer 915 and User Computer 920 of FIG. 9. Computing Device 1000 can comprise any of numerous components, such as for example, one or more Network Interfaces 1010, one or more Memories 1020, one or more Processors 1030 including program Instructions and Logic 1040, one or more Input/Output (I/O) Devices 1050, and one or more User Interfaces 1060 that may be coupled to the I/O Device(s) 1050, etc.

Computing Device 1000 may comprise any device known in the art that is capable of processing data and/or information, such as any general purpose and/or special purpose computer, including as a personal computer, workstation, server, minicomputer, mainframe, supercomputer, computer terminal, laptop, tablet computer (such as an iPad), wearable computer, mobile terminal, Bluetooth device, communicator, smart phone (such as an iPhone, Android device, or BlackBerry), a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general, any device on which a finite state machine resides that is capable of implementing at least a portion of the methods, structures, API, and/or interfaces described herein may comprise Computing Device 1000. Such a Computing Device 1000 can comprise components such as one or more Network Interfaces 1010, one or more Processors 1030, one or more Memories 1020 containing Instructions and Logic 1040, one or more Input/Output (I/O) Devices 1050, and one or more User Interfaces 1060 coupled to the I/O Devices 1050, etc.

Memory 1020 can be any type of apparatus known in the art that is capable of storing analog or digital information, such as instructions and/or data. Examples include a non-volatile memory, volatile memory, Random Access Memory, RAM, Read Only Memory, ROM, flash memory, magnetic media, hard disk, solid state drive, floppy disk, magnetic tape, optical media, optical disk, compact disk, CD, digital versatile disk, DVD, and/or RAID array, etc. The memory device can be coupled to a processor and/or can store instructions adapted to be executed by processor, such as according to an embodiment disclosed herein.

Input/Output (I/O) Device 1050 may comprise any sensory-oriented input and/or output device known in the art, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, vibrator, tactile simulator, and/or tactile pad, optionally including a communications port for communication with other components in Computing Device 1000.

Instructions and Logic 1040 may comprise directions adapted to cause a machine, such as Computing Device 1000, to perform one or more particular activities, operations, or functions. The directions, which can sometimes comprise an entity called a "kernel", "operating system", "program", "application", "utility", "subroutine", "script", "macro", "file", "project", "module", "library", "class", "object", or "Application Programming Interface," etc., can be embodied as machine code, source code, object code, compiled code, assembled code, interpretable code, and/or executable code, etc., in hardware, firmware, and/or software. Instructions and Logic 1040 may reside in Processor 1030 and/or Memory 1020.

Network Interface 1010 may comprise any device, system, or subsystem capable of coupling an information device to a network. For example, Network Interface 1010 can comprise a telephone, cellular phone, cellular modem, telephone data modem, fax modem, wireless transceiver, Ethernet circuit, cable modem, digital subscriber line interface, bridge, hub, router, or other similar device.

Processor 1030 may comprise a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can comprise a general-purpose device, such as a microcontroller and/or a microprocessor, such the Pentium IV series of microprocessors manufactured by the Intel Corporation of Santa Clara, California In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

User Interface 1060 may comprise any device and/or means for rendering information to a user and/or requesting information from the user. User Interface 1060 may include, for example, at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, auto-sizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

The present invention can be realized in hardware, software, or a combination of hardware and software. The invention can be realized in a centralized fashion in one computer system, or in a distributed fashion where different elements are spread across several computer systems. Any kind of computer system or other apparatus adapted for carrying out the methods described herein is suitable. A typical combination of hardware and software can be a general-purpose computer system with a computer program that, when being loaded and executed, controls the computer system such that it carries out the methods described herein.

Although the present disclosure provides certain embodiments and applications, other embodiments apparent to those of ordinary skill in the art, including embodiments that do not provide all of the features and advantages set forth herein, are also within the scope of this disclosure.

The present invention, as already noted, can be embedded in a computer program product, such as a computer-readable storage medium or device which when loaded into a computer system is able to carry out the different methods described herein. "Computer program" in the present context means any expression, in any language, code or notation, of a set of instructions intended to cause a system having an information processing capability to perform a particular function either directly or indirectly after either or both of the following: a) conversion to another language, code or notation; or b) reproduction in a different material form.

The foregoing disclosure has been set forth merely to illustrate the invention and is not intended to be limiting. It will be appreciated that modifications, variations and additional embodiments are covered by the above teachings and within the purview of the appended claims without departing from the spirit and intended scope of the invention. Other logic may also be provided as part of the exemplary embodiments but are not included here so as not to obfuscate the present invention. Since modifications of the disclosed embodiments incorporating the spirit and substance of the invention may occur to persons skilled in the art, the invention should be construed to include everything within the scope of the appended claims and equivalents thereof.

The invention claimed is:

1. A computerized method for suggesting web pages to users comprising:
    storing, in a content repository on a server computer, a plurality of representations of folders and web pages;
    creating a folder ID for each folder created by one of a plurality of users;
    creating a link ID for each web page saved by at least one of the users to one or more of the folders;
    associating each link ID with one or more folder IDs based on the one or more folders in which the link ID's respective web page was saved;
    receiving, from a client device, a request from a first user of the plurality of users for one or more suggested web pages based on a basis link ID; and
    in response to the request:
        determining a plurality of related link IDs, wherein each related link ID and the basis link ID are associated with one or more common folder IDs among folders created by one or more of the plurality of users other than the first user;
        determining a plurality of multi-hop link IDs, wherein each multi-hop link ID and one or more of the related link IDs are associated with one or more common folder IDs among folders created by one or more of the plurality of users other than the first user; and
        providing one or more of the respective web pages corresponding to the plurality of related link IDs and the plurality of multi-hop link IDs as suggested web pages to the client device.

2. The computerized method of claim 1, further comprising determining a copresence count for each of a plurality of pairs of link IDs, wherein the copresence count equals the number of associated folder IDs that each respective pair of link IDs have in common.

3. The computerized method of claim 2, wherein the step of determining a plurality of related link IDs comprises determining two or more link IDs that each have a copresence count with the basis link ID that equals or exceeds a first threshold value.

4. The computerized method of claim 3, wherein the step of determining a plurality of multi-hop link IDs comprises determining two or more link IDs that each have a copresence count with one of the related link IDs that equals or exceeds a second threshold value.

5. The computerized method of claim 3, wherein the step of determining a plurality of multi-hop link IDs comprises determining two or more link IDs that each have a copresence count with one of the related link IDs that equals or exceeds a second threshold value and have a copresence count with the basis link ID that exceeds a third threshold value.

6. The computerized method of claim 1, wherein the step of providing one or more of the respective web pages comprises providing the respective web pages corresponding to the plurality of related link IDs first, and then providing the respective web pages corresponding to the plurality of multi-hop link IDs only after a second request from the client device for more suggested web pages.

7. The computerized method of claim 1, wherein the step of providing one or more of the respective web pages comprises providing more respective web pages corresponding to the plurality of related link IDs than respective web pages corresponding to the plurality of multi-hop link IDs.

8. The computerized method of claim 1, further comprising:
  determining a plurality of N-hop link IDs, wherein each N-hop link ID and one or more of the multi-hop link IDs are associated with one or more common folder IDs among folders created by one or more of the plurality of users other than the first user; and
  providing one or more of the respective web pages corresponding to the plurality of N-hop link IDs as suggested web pages to the client device.

9. The computerized method of claim 1, wherein the request comprises one or more constraints on characteristics of the suggested web pages, and wherein providing one or more of the respective web pages as suggested web pages is based on the one or more constraints.

10. The computerized method of claim 1, wherein the one or more constraints comprise one or more of a keyword, a regular expression, a date-time value, and an activity metric.

11. A system for suggesting web pages to users comprising:
  a client device comprising a suggestion assistant;
  a server computer configured to:
    store, in a content repository, a plurality of representations of folders and web pages;
    create a folder ID for each folder created by one of a plurality of users;
    create a link ID for each web page saved by at least one of the users to one or more of the folders;
    associate each link ID with one or more folder IDs based on the one or more folders in which the link ID's respective web page was saved;
    receive, from the suggestion assistant, a request from a first user of the plurality of users for one or more suggested web pages based on a basis link ID; and
    in response to the request:
      determine a plurality of related link IDs, wherein each related link ID and the basis link ID are associated with one or more common folder IDs among folders created by one or more of the plurality of users other than the first user;
      determine a plurality of multi-hop link IDs, wherein each multi-hop link ID and one or more of the related link IDs are associated with one or more common folder IDs among folders created by one or more of the plurality of users other than the first user; and
      provide one or more of the respective web pages corresponding to the plurality of related link IDs and the plurality of multi-hop link IDs as suggested web pages to the suggestion assistant on the client device.

12. The system of claim 11, wherein the server computer is further configured to determine a copresence count for each of a plurality of pairs of link IDs, wherein the copresence count equals the number of associated folder IDs that each respective pair of link IDs have in common.

13. The system of claim 12, wherein server computer is further configured to determine two or more link IDs that each have a copresence count with the basis link ID that equals or exceeds a first threshold value.

14. The system of claim 13, wherein the server computer is further configured to determine two or more link IDs that each have a copresence count with one of the related link IDs that equals or exceeds a second threshold value.

15. The system of claim 13, wherein the server computer is further configured to determine two or more link IDs that each have a copresence count with one of the related link IDs that equals or exceeds a second threshold value and have a copresence count with the basis link ID that exceeds a third threshold value.

16. The system of claim 11, wherein the server computer is further configured to provide the respective web pages corresponding to the plurality of related link IDs first, and then provide the respective web pages corresponding to the plurality of multi-hop link IDs only after a second request from the suggestion assistant for more suggested web pages.

17. The system of claim 11, wherein the server computer is further configured to provide more respective web pages corresponding to the plurality of related link IDs than respective web pages corresponding to the plurality of multi-hop link IDs.

18. The system of claim 11, wherein the server computer is further configured to:
  determine a plurality of N-hop link IDs, wherein each N-hop link ID and one or more of the multi-hop link IDs are associated with one or more common folder IDs among folders created by one or more of the plurality of users other than the first user; and
  provide one or more of the respective web pages corresponding to the plurality of N-hop link IDs as suggested web pages to the suggestion assistant on the client device.

19. The system of claim 11, wherein the request comprises one or more constraints on characteristics of the suggested web pages, and wherein the server computer is further configured to provide one or more of the respective web pages as suggested web pages based on the one or more constraints.

20. The system of claim 11, wherein the one or more constraints comprise one or more of a keyword, a regular expression, a date-time value, and an activity metric.

* * * * *